(12) United States Patent
Carbonneau et al.

(10) Patent No.: US 9,395,193 B2
(45) Date of Patent: Jul. 19, 2016

(54) SCALABLE AND EFFICIENT CUTTING OF MAP TILES

(71) Applicant: Apple Inc., Cupertino, CA (US)

(72) Inventors: Guillaume A. Carbonneau, Alameda, CA (US); Vincent Dumont, San Francisco, CA (US); Anuj Dhamija, Cupertino, CA (US); Denis Laprise, Saratoga, CA (US); Okan Arikan, Mountain View, CA (US); James A. Howard, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 735 days.

(21) Appl. No.: 13/632,004

(22) Filed: Sep. 30, 2012

(65) Prior Publication Data

US 2013/0328879 A1    Dec. 12, 2013

Related U.S. Application Data

(60) Provisional application No. 61/657,872, filed on Jun. 10, 2012.

(51) Int. Cl.
   - *G06T 11/20* (2006.01)
   - *G01C 21/32* (2006.01)
   - *G06T 11/00* (2006.01)

(52) U.S. Cl.
   CPC .............. *G01C 21/32* (2013.01); *G06T 11/00* (2013.01)

(58) Field of Classification Search
   CPC ............... G01C 21/32; G01C 21/3626; G01C 21/3635; G01C 21/3667
   See application file for complete search history.

(56) References Cited

U.S. PATENT DOCUMENTS

| | | | |
|---|---|---|---|
| 5,787,233 A | 7/1998 | Akimoto | |
| 5,848,375 A | 12/1998 | Nunobiki et al. | |
| 6,480,783 B1 | 11/2002 | Myr | |
| 6,600,485 B1 * | 7/2003 | Yoshida | G06T 17/30 345/419 |

(Continued)

FOREIGN PATENT DOCUMENTS

| | | |
|---|---|---|
| WO | WO 2005/103624 | 11/2005 |
| WO | WO 2007/056450 | 5/2007 |
| WO | WO 2011/146141 | 11/2011 |

OTHER PUBLICATIONS

Chen, Ching-Chien, et al., "Automatically Conflating Road Vector Data with Orthoimagery," Geoinformatica, Mar. 2006, pp. 495-530, Springer Science + Business Media, LLC.

(Continued)

*Primary Examiner* — Peter Hoang
(74) *Attorney, Agent, or Firm* — Adeli LLP

(57) ABSTRACT

A process is provided that reduces the amount of data for a map tile that could not be displayed separately on the scale of that tile. The process generates an equivalent of the road data by rasterizing the vectors representing road segments lying within a tile and generating a connectivity mask that keeps track of which pixels are connected to which other pixels along the vectors. The process constructs an undirected graph. Each "on" pixel of the undirected graph represents a vertex and the vertices are connected by edges generated from the connectivity graph, but without a set direction. The process traces the undirected graph to generate chains of connected road segments and takes the chains and simplifies them in order to reduce the amount of data that must be stored and transmitted for the tile in order to produce all the visible roads of the tile at that scale.

26 Claims, 20 Drawing Sheets

(56) References Cited

U.S. PATENT DOCUMENTS

| | | |
|---|---|---|
| 6,615,130 B2 | 9/2003 | Myr |
| 7,379,811 B2 | 5/2008 | Rasmussen et al. |
| 7,551,172 B2 | 6/2009 | Yaron et al. |
| 7,746,343 B1 | 6/2010 | Charaniya et al. |
| 8,237,713 B2 | 8/2012 | Yaron et al. |
| 8,681,176 B1 | 3/2014 | Maurer et al. |
| 8,738,284 B1 | 5/2014 | Jones |
| 8,872,848 B1* | 10/2014 | Appleton ............ G09G 5/14 345/629 |
| 2001/0028350 A1 | 10/2001 | Matsuoka et al. |
| 2003/0231190 A1 | 12/2003 | Jawerth et al. |
| 2004/0207642 A1* | 10/2004 | Crisu et al. ............ 345/626 |
| 2004/0236507 A1 | 11/2004 | Maruyama et al. |
| 2006/0025923 A1 | 2/2006 | Dotan et al. |
| 2007/0080830 A1 | 4/2007 | Sacks |
| 2008/0016145 A1 | 1/2008 | Takase et al. |
| 2008/0238941 A1 | 10/2008 | Kinnan et al. |
| 2010/0002007 A1* | 1/2010 | Rajagopalan ............ 345/581 |
| 2010/0074538 A1 | 3/2010 | Mishra et al. |
| 2010/0250536 A1 | 9/2010 | Broadbent |
| 2011/0207446 A1 | 8/2011 | Iwuchukwu |
| 2012/0050489 A1 | 3/2012 | Gupta et al. |
| 2012/0206469 A1* | 8/2012 | Hulubei et al. ............ 345/581 |
| 2012/0209518 A1 | 8/2012 | Nowak et al. |
| 2013/0021382 A1* | 1/2013 | Morlock et al. ............ 345/672 |
| 2013/0076784 A1 | 3/2013 | Maurer et al. |
| 2013/0328937 A1 | 12/2013 | Pirwani et al. |

OTHER PUBLICATIONS

Hu, Jiuxiang, et al., "Road Network Extraction and Intersection Detection From Aerial Images by Tracking Road Footprints", IEEE Transactions on Geoscience and Remote Sensing, Dec. 2007, pp. 4144-4157, vol. 45, No. 12, IEEE.

Poullis, Charalambos, et al., "Delineation and geometric modeling of road networks", ISPRS Journal of Photogrammetry and Remote Sensing, Month Unknown, 2010, pp. 165-181, vol. 65, Computer Graphics and Immersive Technologies Lab, Integrated Media Systems Center, University of Southern California, United States.

Author Unknown, "(SC4) Sim City for Highways & Autobahns," Aug. 12, 2011, pp. 1-35, available at http://www.skyscrapercity.com/showthread.php?t=639496&page=14.

Author Unknown, "Resolve Road Conflicts (Cartography)," ARCGIS help 10.1, Nov. 11, 2011, 4 pages, Esri, available at http://help.arcgis.com/en/arcgisdesktop/10.0/help/index.html#//007000000019000000.htm.

* cited by examiner

Undirected graph 910

Traced graph 1110

Traced graph

Simplify complexity

1110

Simplified vertices

1410

SCALABLE AND EFFICIENT CUTTING OF MAP TILES

CLAIM OF BENEFIT TO PRIOR APPLICATIONS

This Application claims the benefit of U.S. Provisional Application 61/657,872, entitled "Scalable and Efficient Cutting of Map Tiles," filed Jun. 10, 2012. U.S. Provisional Application 61/657,872 is herein incorporated by reference.

BACKGROUND

Computerized map programs allow a user to view a great deal of data. Some applications allow a client device to download map data that encompasses any location in the world at a detailed level. Such applications entail enormous quantities of data to include all the roads, shorelines, parks, etc. in the world. This data is too voluminous to be displayed or downloaded all at once. Accordingly, many applications provide map tiles with data at appropriate scales. Before delivering these tiles, the tiles must be generated and optimized for downloading to a client device.

Generating the tiles requires processing an enormous amount of computerized data about geographical features of the regions, which the computed tiles will represent. For individual tiles at a given zoom level, there may be far more data than can be displayed given the scale of the tile and the resolution of the map. For example, there may be many road segments known in the data that occupy an area represented by a single pixel of the map of which the tile is a part. Similarly, there may be multiple roads running parallel with each other within a line a single pixel wide on the map. Sending data representing each of these road segments would be a waste of bandwidth as the roads could not be displayed individually.

BRIEF SUMMARY

Maps contain many features. However, some features of a geographical area may be too small to be represented on a map at some particular scale. The smallest feature a digital map can display is one pixel by one pixel. The real world area that a pixel represents depends on the scale of the map. Depending on the scale of the map, multiple road segments can be found within one pixel of the map. As those road segments would cover the same pixel, keeping track of all those roads at that scale would be a waste of memory space on the servers that store the map tile. Additionally, sending such redundant information would use up potentially expensive bandwidth. Furthermore, processing the information in its eventual use with a mapping application on a device would also be more complicated. Similar problems arise for other relatively small features (e.g., two small parks within a real world distance of 100 meters in a 100 km to a side tile).

Some embodiments use a process that reduces the amount of data for a tile that could not be displayed separately on the scale of that tile. The process of some embodiments generates an equivalent of the road data by: (1) rasterizing the vectors representing road segments lying within a tile, (2) generating a connectivity mask for the tile(s). The connectivity mask keeps track of which pixels are connected to which other pixels along the vectors so that, e.g., two adjacent pixels representing parts of different roads are treated differently than two adjacent pixels representing parts of the same road. The process further (3) constructs an undirected graph. Each "on" pixel of the undirected graph represents a vertex and the vertices are connected by edges generated from the connectivity graph, but without a set direction (e.g., a north-south edge does not differentiate whether the original road direction was north or south). The process then (4) traces the undirected graph to generate chains of connected road segments and (5) takes the chains of connected road segments and simplifies them in order to reduce the amount of data that must be stored and transmitted for the tile in order to produce all the visible roads of the tile at that scale.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Map tiles are used in some embodiments to present 3D map presentations for browsing and navigation on a client device. In some embodiments, the client device (e.g., a mobile device) has a touch-sensitive screen and a multi-touch interface that allow a user to interact with the presentations through touch and gestural inputs on the screen. In other embodiments, the presentations are provided on a device that does not have a touch-sensitive screen. In some embodiments described below, these 3D presentations are provided by an integrated mapping application that provides several useful modalities, such as location browsing, map searching, route identifying, and route navigation operations. However, in other embodiments, the mapping application does not employ all of these modalities and/or provides only 2D map presentations. For instance, in some embodiments, the mapping application does not provide route navigation.

Section I below describes the mapping application of some embodiments of the invention. Section II then describes re-encoding of road tiles to eliminate unnecessary data. Section III then describes electronic devices that employ the mapping application of some embodiments. Section IV lastly describes location services uses by some embodiments of the invention.

I. Mapping Application

The mapping application of some embodiments is an integrated mapping application that includes several useful modalities, including location browsing, map searching, route identifying and route navigating operations. This integrated application (referred to below as the mapping application, the navigation application or the integrated application) in some embodiment is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 1:
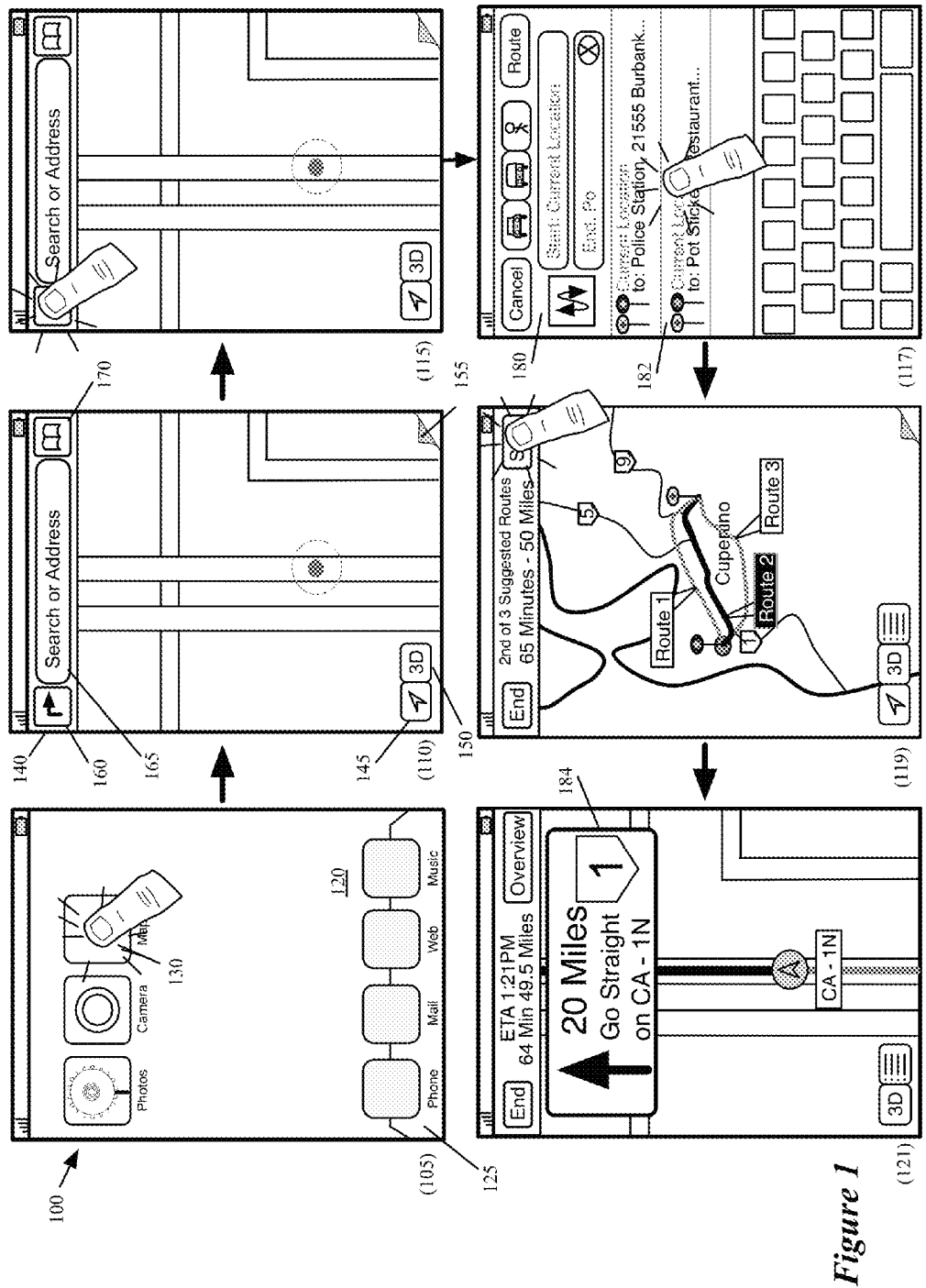
FIG. 1 illustrates an example of a device that executes an integrated mapping application of some embodiments of the invention.

FIG. 1 illustrates an example of a device 100 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows six stages 105, 110, 115, 117, 119, 121 of interaction with the mapping application. The first stage 105 shows the device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments displays (1) a map of the current location of the device and (2) several UI controls arranged in a top bar 140, and as floating controls. As shown in FIG. 1, the floating controls include an indicator 145, a 3D control 150, and a page curl control 155, while the top bar 140 includes a direction control 160, a search field 165, and a bookmark control 170.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any input on the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g. 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows location and routes to be bookmarked by the application. The position indicator 145 allows the current position of the device to be specifically noted on the map. Once this indicator is selected, the application maintains the current position of the device in the center of the map. In some embodiments, it can also identify the direction to which the device currently points.

The 3D control 150 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 155 is a control that allows the application to minimize the number of on-screen controls, by placing certain less frequently used actions in a secondary UI screen that is accessible through the page curl control that is displayed on the map. In some embodiments, the page curl is permanently displayed on at least some of the map views that the application provides. For instance, in some embodiments, the application displays the page curl permanently on the starting page (illustrated in the second stage 110) that it provides for allowing a user to browse or search a location or to identify a route.

The direction control 160 opens a direction entry page 180 through which a user can request a route to be identified between a starting location and an ending location. The third stage 115 of FIG. 1 illustrates that the selection of the direction control 160 opens the direction entry page 180, which is shown in the fourth stage 117. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

The fourth stage 117 shows that the direction entry page 180 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in concurrently filed U.S. patent application Ser. No. 13/632,102, entitled "Problem Reporting in Maps," now published as U.S. Patent Publication 2013/0326407. U.S. patent application Ser. No. 13/632,102 is incorporated herein by reference.

The fourth stage illustrates the user selecting one of the recent directions that was auto-populated in the table 182. The fifth stage 119 then shows three routes on a 2D map view between the specified start and end locations specified through the page 180. It also shows the selection of the second route and some information about this route in a bar at the top of the layout. This bar is shown to include start and end buttons. The start button is shown to be selected in the fifth stage.

As shown in the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 184 that identifies the distance to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 184 to the top edge of the presentation a short time period after starting the navigation presentation. As further described below, the application requires the user tap on the navigated map to bring back the top bar, its controls and the floating controls, and requires another tap to remove these controls again from the map, in some embodiments. Other embodiments provide other mechanisms for viewing and removing these controls.

Figure 2:
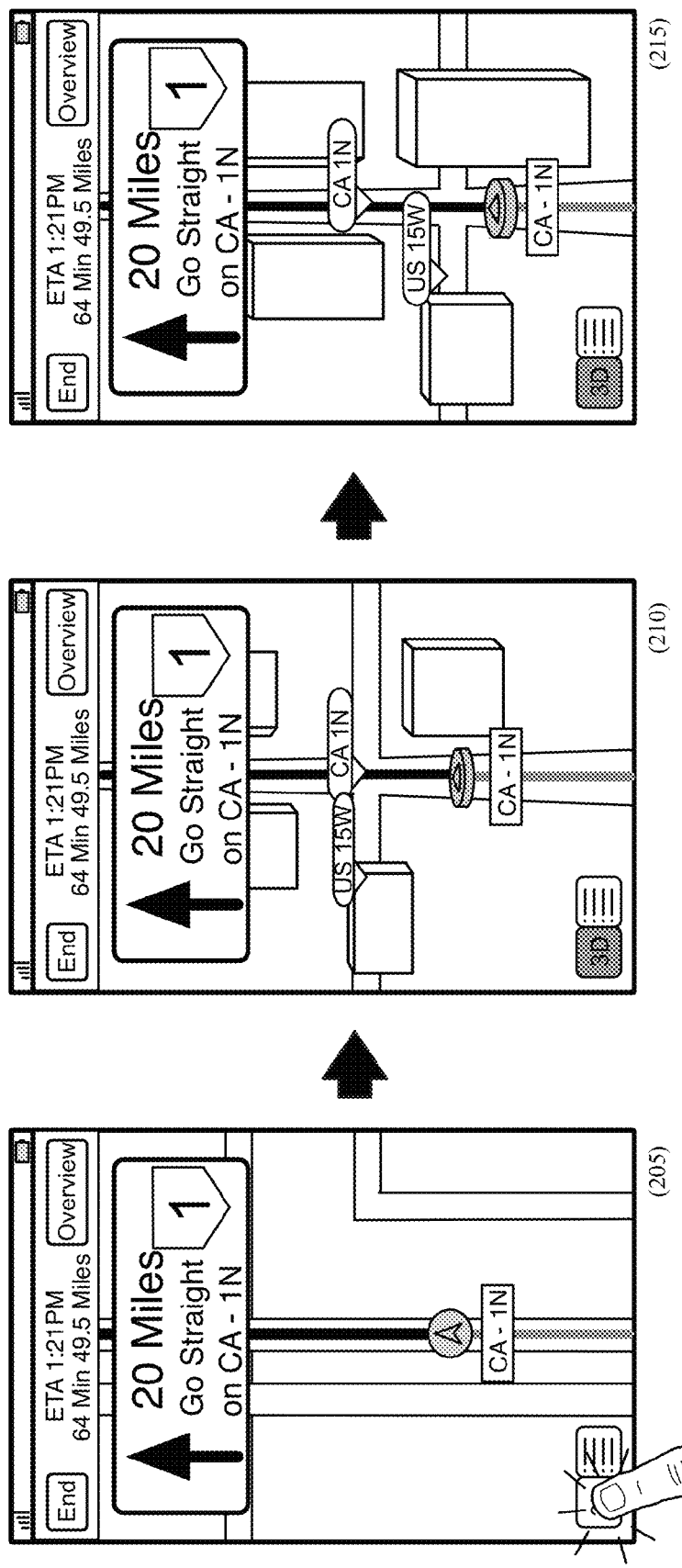
FIG. 2 illustrates how the navigation application of some embodiments provides the 3D control as a quick mechanism of entering a 3D navigating mode.

The navigation application of some embodiments can display navigation in either a 2D mode or a 3D mode. As mentioned above, one of the floating controls is the 3D control 150 that allows a user to view a navigation presentation in three dimensions (3D). FIG. 2 illustrates how the navigation application of some embodiments provides the 3D control 150 as a quick mechanism for entering a 3D navigating mode. This figure illustrates this operation in three stages 205-215. The first stage 205 illustrates the user selecting the 3D control 150 while viewing a two-dimensional navigation presentation.

The second stage 210 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view.

The third stage 215 then illustrates the navigation presentation at the end of its transition into its 3D appearance. As shown by the difference between the heights of the buildings in the second and third stages, the transition from 2D to 3D navigation in some embodiments includes an animation that shows three dimensional objects in the navigated map becoming larger. Generating such animation that shows objects rising/falling and becoming larger/smaller is further described in concurrently filed U.S. patent application Ser. No. 13/632,027, entitled "Displaying 3D Objects in a 3D Map Presentation," now published as U.S. Patent Publication 2014/0071119.

II. Road Tile Re-Encoding

Map tiles in some embodiments can be sent from a server to a client then assembled to be displayed on computer screens and screens of other electronic devices as graphical images. Before the map tiles can be used to generate a map presentation, the map tiles themselves must be generated. In some embodiments these map tiles are generated by tile cutting operations on servers, or provided to servers by other computers or electronic devices that perform the tile cutting operations.

Graphical images in a tile are built up from individual pixels. Whatever the scale of a map on an electronic display, the smallest feature the map can display is one pixel by one pixel. The real world area that a pixel represents depends on the scale of the map. For example, if a map is a square representing 100 km per side and comprises 1000×1000 pixels, then each pixel represents a square 100 meters to a side. Thus any detail smaller than 100 meters wide cannot be displayed on an electronically displayed map at that scale and with that resolution. In some real world cases, multiple roads in the same direction may be found less than 100 meters apart. However, as all those roads would cover the same set of pixels (i.e., a one pixel wide line for the length that the roads run parallel), keeping track of all those roads at that scale would be a waste of memory space on the servers that store the map tile. Sending such redundant information would use up potentially expensive bandwidth. Processing the information in its eventual use with a mapping application on a device would also be more complicated. Similar problems arise for other relatively small features (e.g., two small parks within a real world distance of 100 meters in a 100 km to a side tile). Accordingly, some embodiments use a process that reduces the amount of data for a tile that could not be displayed separately on the scale of that tile.

Figure 3:
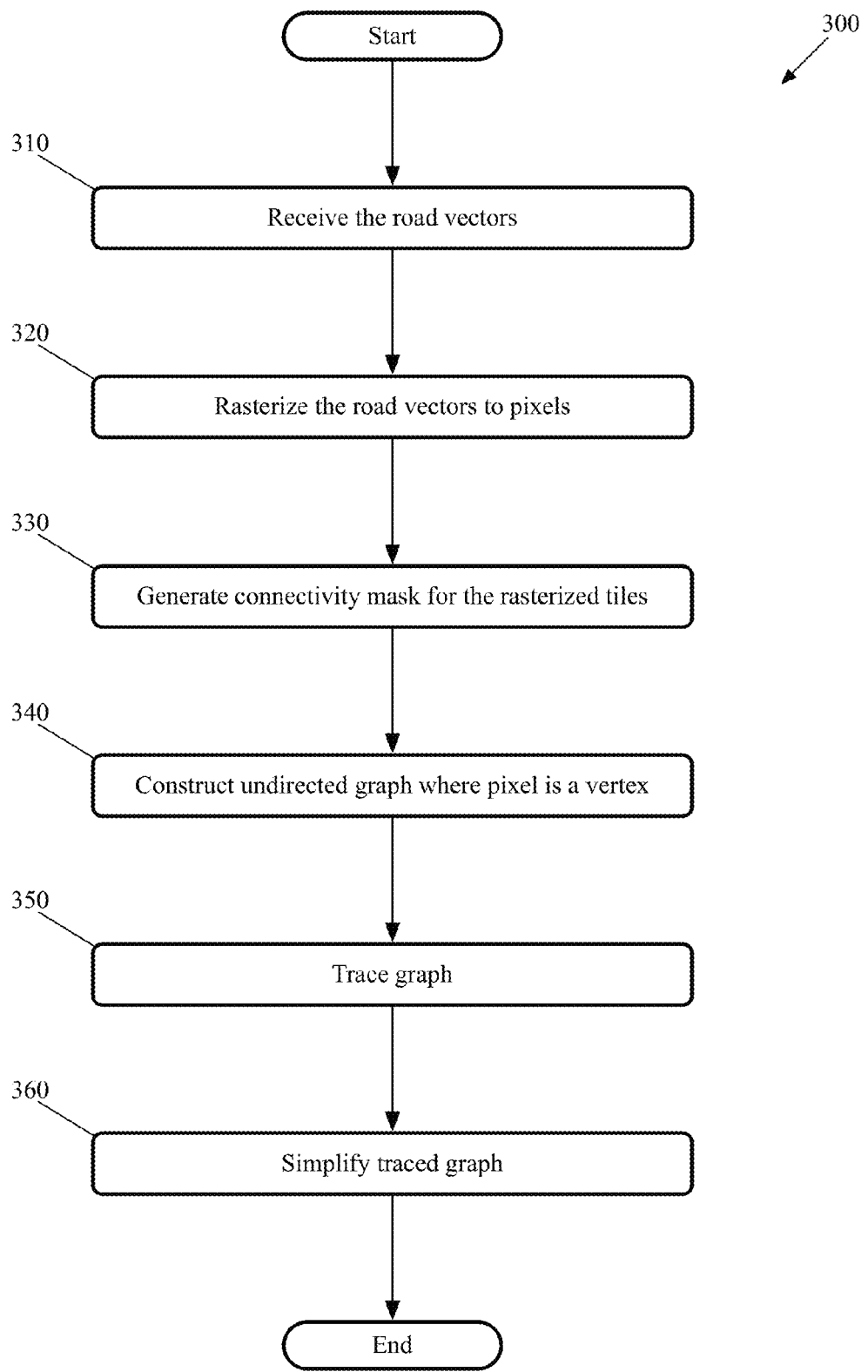
FIG. 3 conceptually illustrates a process for compressing vector information used to make map lines in some embodiments.

FIG. 3 conceptually illustrates a process 300 for compressing vector information used to make map lines in some embodiments. The figure provides an overview of a set of processes which will be described individually in more detail in the following subsections. The process 300 is performed on a per road type basis in some embodiments. That is, it is performed once for surface roads, once for highways, etc. The process 300 begins by receiving (at 310) a set of road vectors for a set of map tiles (e.g., a set of at least one map tile). The vectors can be received from any source. For example, the vectors can be received as data from a mapping service. The process 300 plots the vectors on the map tiles at a particular zoom level and rasterizes (at 320) the vectors. The rasterization identifies a set of pixels in the map tiles that the road vectors pass through. In some embodiments, the rasterization process uses the Bresenham line algorithm. In other embodiments, other algorithms are used to rasterize the vectors.

After rasterizing the vectors into pixels in the tile(s), the process 300 generates (at 330) a connectivity mask for the tile(s). The connectivity mask keeps track of which pixels are connected to which other pixels along the vectors so that, e.g., two adjacent pixels representing parts of different roads are treated differently than two adjacent pixels representing parts of the same road. By converting the vectors to pixels in a connectivity mask, the process 300 weeds out redundant vectors and vector segments (e.g., segments of roads in the same direction as each other that are so close to each other that they are less than one pixel apart). A vector segment can be part of or all of a vector. For example when two vectors overlap, but one is shorter than the other (or the middle of both vectors overlap, but not the ends of the vectors), the overlapping portion is a vector segment. Only the vector segment where the vectors overlap is redundant for that pair of vectors, so the data about the overlapping segment is eliminated without eliminating the data about the non-overlapping segments.

Once the process 300 generates the connectivity mask, the process 300 constructs (at 340) an undirected graph. In the undirected graph, each "on" pixel (sometimes called "active pixels) represents a vertex and the vertices are connected by edges generated from the connectivity graph, but without a set direction (e.g., a north-south edge does not differentiate whether the original road direction was north or south). By generating the undirected graph, the process 300 eliminates redundant roads that cover the same sets of pixels, but run in opposite directions.

The process then traces (at 350) the undirected graph to generate chains of connected road segments. The process 300 takes the chains of connected road segments and simplifies (at 360) them in order to reduce the amount of data that must be stored and transmitted for the tile in order to produce all the visible roads of the tile at that scale.

A. Rasterization

Figure 4:
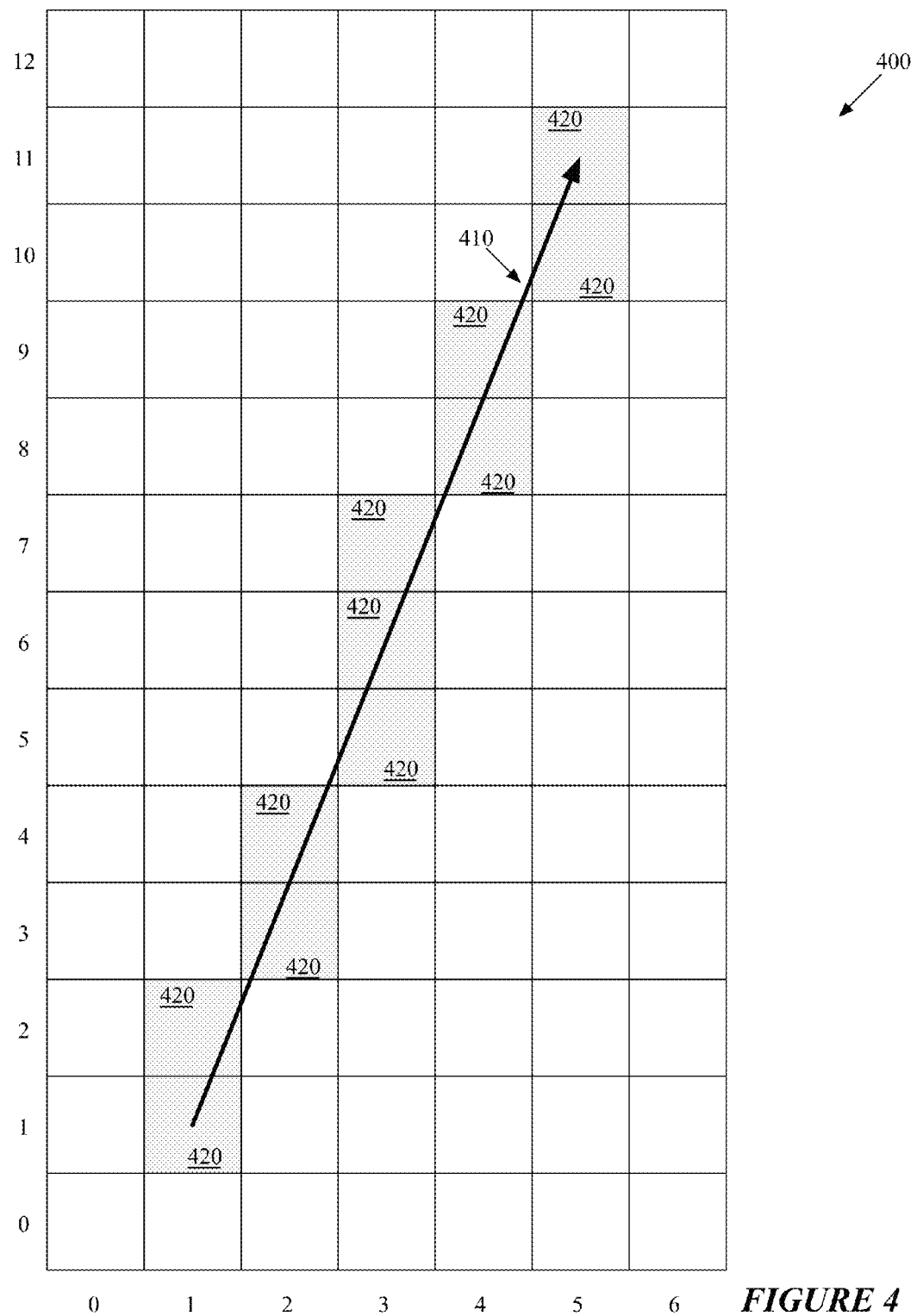
FIG. 4 conceptually illustrates rasterization of a vector representing a road.

FIG. 4 conceptually illustrates rasterization of a vector representing a road. In some embodiments, rasterization converts a shape that is described in vector graphics format into a set of pixels (or data). The figure includes tile 400, vector 410, and dark pixels 420. The tile 400 is a 7×13 pixel tile. Pixels in this figure are numbered (0,0) from the lower left pixel to (6,12) for the upper right pixel. Vector 410 goes from pixel (1,1) to pixel (5,11). The dark pixels 420 represent the result of the rasterization of the vector. The vector represents a road proceeding approximately north-by-northeast. It has been converted to pixels using the Bresenham line algorithm. However, in other embodiments, other algorithms can be used to convert vectors to pixels. The dark pixels 420 are the closest the tile can come to representing the vector 410. One of ordinary skill in the art will understand that the tile has so few pixels for reasons of clarity and that in some embodiments, the individual tiles may be hundreds or even thousands of pixels to a side.

Figure 5:
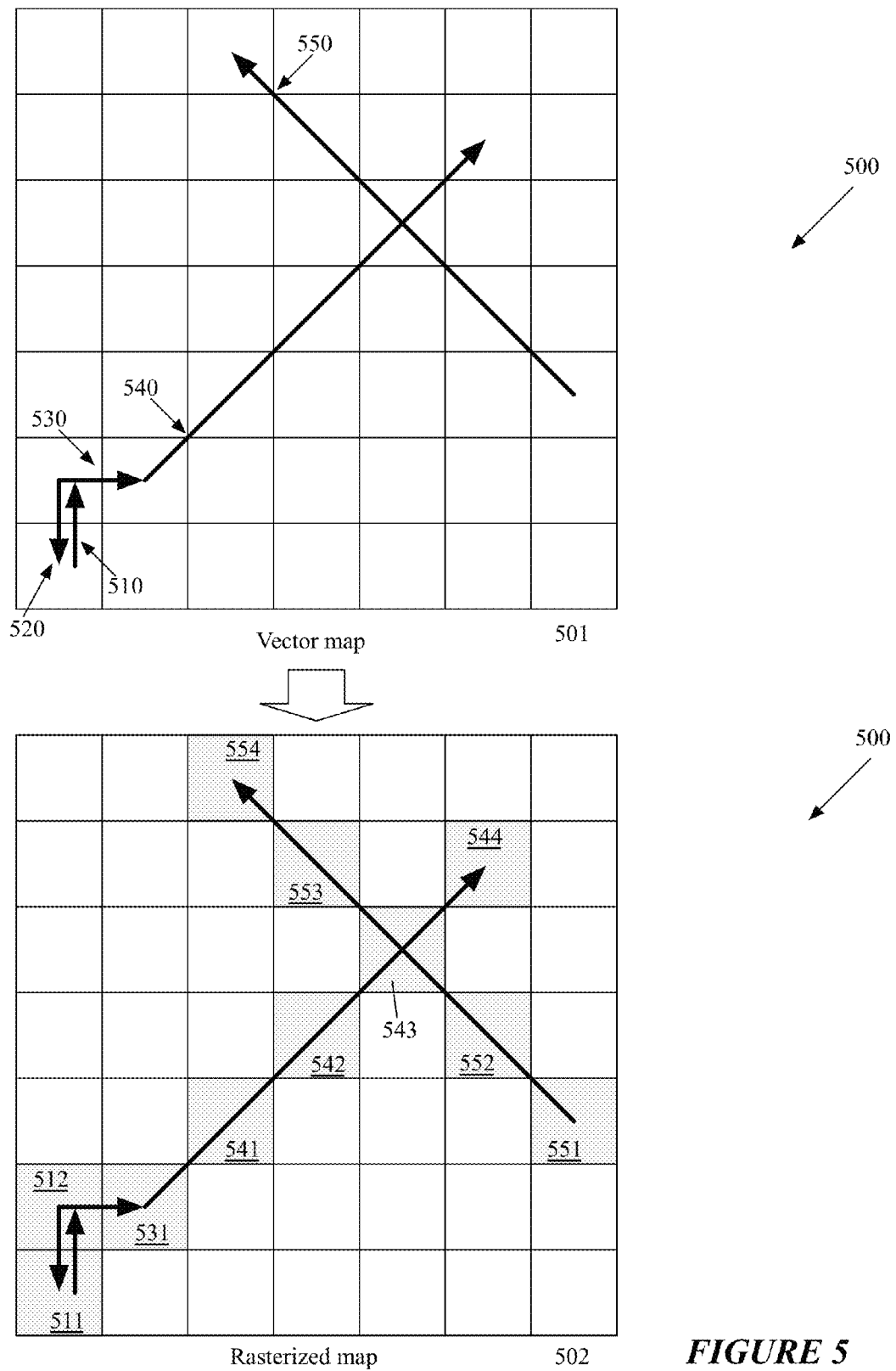
FIG. 5 conceptually illustrates rasterization of multiple vectors representing roads in some embodiments.

FIG. 5 conceptually illustrates rasterization of multiple vectors representing roads in some embodiments. This figure includes both before and after illustrations of the rasterization. The figure includes tile 500 in two stages 501 and 502. Stage 501 shows the vectors before rasterization and stage 502 shows the vectors and the corresponding pixels after rasterization. The vectors 510, 520, 530, 540, and 550 represent roads. Vectors 510 (north) and 520 (south) could represent one road with lanes in both directions, or two roads close to each other in opposite directions, depending on the scale of the tile. Vector 530 (east) represents a single road that connects to the end of vector 510 and the beginnings of vectors 520 and 540. Vector 540 also intersects with vector 550.

The rasterization of the vectors generates rasterized pixels 511, 512, 531, 541, 542, 543, 544, 551, 552, 553, and 554. Each rasterized pixel has been numbered based on the lowest number vector in it. Some pixels represent parts of multiple vectors. Pixel 511 represents part of both vectors 510 and 520. Pixel 512 represents parts of vectors 510, 520, and 530. Pixel 543 represents parts of vectors 540 and 550, etc. Because in the tile, each pixel is the smallest measure of detail, each pixel is either on or off. When no vectors (roads) pass through the pixel, the pixel is off. When any vectors (roads) pass substantially through the pixel, the pixel is on.

B. Connectivity Byte Map

Figure 6:
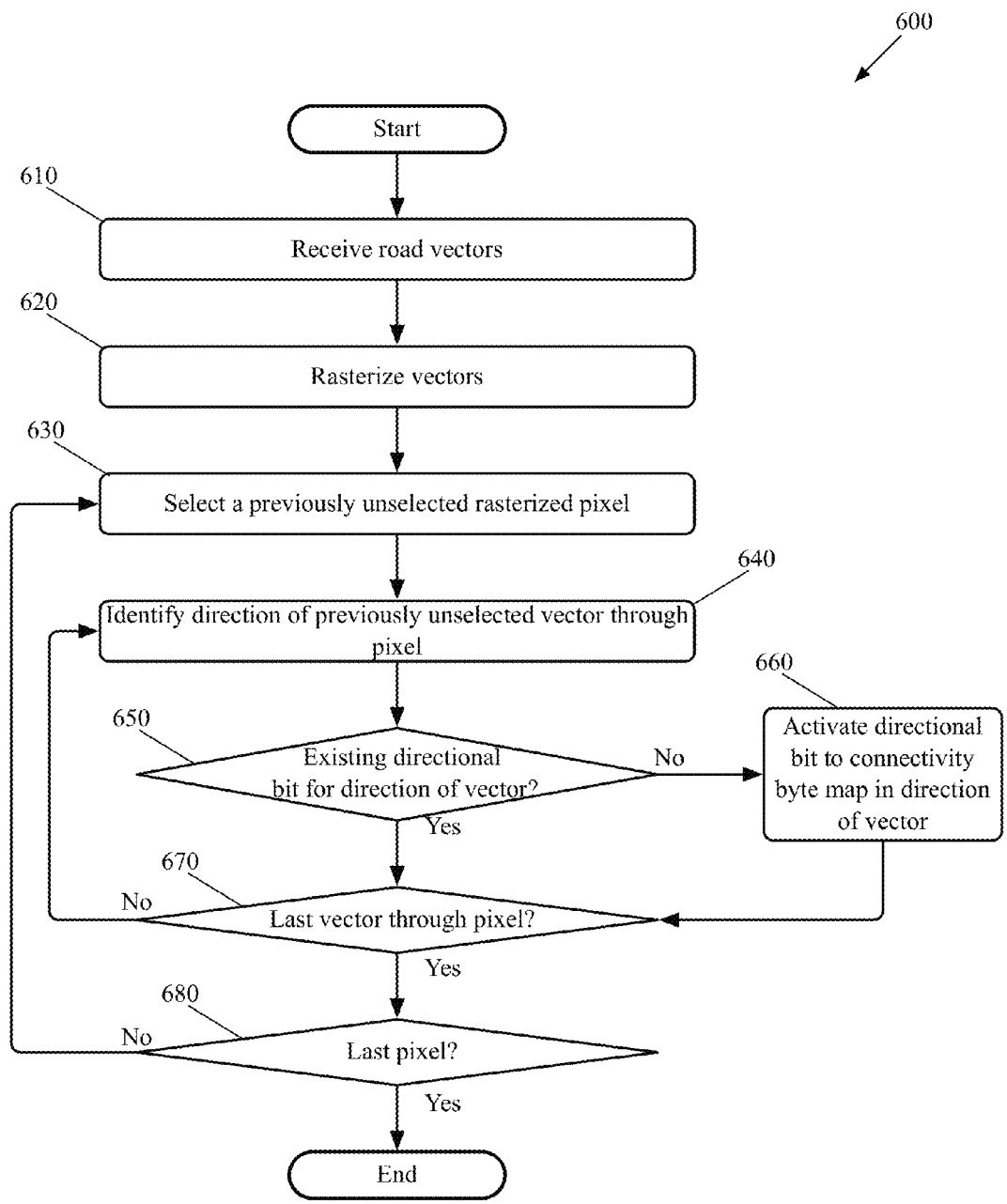
FIG. 6 conceptually illustrates a process for generating a connectivity byte mask in some embodiments.

A set of pixels with no data beyond whether they are on or off would not keep track of which adjacent pixels are directly connected to which other adjacent pixels. For example, there is no direct connection between pixel 511 and pixel 531, even though they are adjacent to each other. Accordingly, after performing the rasterization operation on the vectors in some embodiments, a process generates a connectivity byte mask of the pixels to keep track of which pixels are connected to each other. A connectivity byte mask, in some embodiments, is a set of sixteen-bits in two 8-bit bytes, two bytes for each pixel. The set of bits keeps track of the directions from which various vectors entered the pixel. FIG. 6 conceptually illustrates a process 600 for generating a connectivity byte mask in some embodiments. FIG. 6 will be described with references to FIGS. 7 and 8, which will be briefly described first and FIG. 9 which will be described in context.

Figure 7:
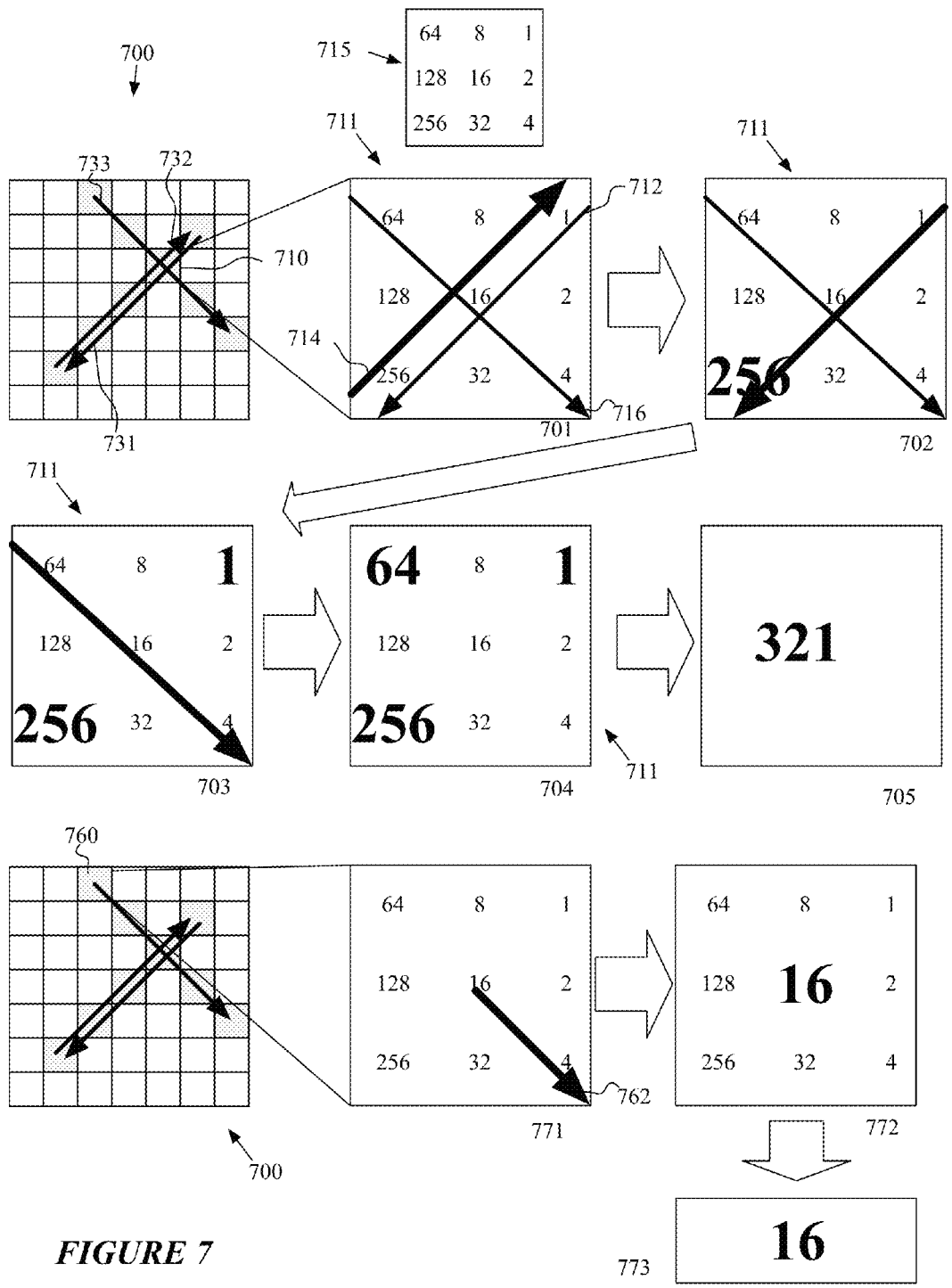
FIG. 7 conceptually illustrates the generation of two individual connectivity bytes from two different pixels in a tile.

FIG. 7 conceptually illustrates the generation of two individual connectivity bytes from two different pixels in a tile. FIG. 7 includes tile 700, with pixel 710, connectivity legend 715, and pixel 760. The figure also includes a conceptual illustration 711 of pixel 710 and the vectors 712, 714, and 716 that pass through the pixel in multiple stages 701-705. The figure also includes a conceptual illustration 761 of pixel 760 and the vector 762, that passes out of the pixel in multiple stages 771-773.

Tile 700 is an 8×8 tile with three vectors 731-733 on it, the vectors have been rasterized into the dark pixels in the tile. Two of the pixels 710 and 760 are singled out for closer description. Pixel 710 is a pixel with three vectors 712, 714, and 716 passing through in different directions, southeast, southwest, and northeast, respectively. The vectors 712, 714, and 716 are part of the vectors 731-733, respectively. Pixel 760 is a pixel with one vector originating in the pixel and passing out through the southeast. Connectivity legend 715 is a conceptual representation of the bit values that make up the two bytes in the connectivity byte map of some embodiments. The legend relates the direction from which a vector enters a pixel with the bit that corresponds to that vector in the connectivity byte map.

Besides being represented by a dark pixel, the pixel 710 is also represented in FIG. 7 by pixel representation 711. In stage 701, the pixel representation 711 contains the small numbers (1, 2, 4, 8, 16, 32, 64, 128, and 256) arranged in the same arrangement as the connectivity legend 715. The numbers represent 9 bits within the two connectivity bytes. Each number represents one bit. For example, number 8 represents the fourth bit in a binary number represented by the two bytes. When one or multiple bits are active, the connectivity bits can be represented as a number between 1 and 511 depending on which bits are active. For example, 00000001 01000000 represents the ninth and seventh bits being active, which can be represented by the sum of 256 and 64, that is, 320. Each bit position/number represents one entry direction for a vector. 1 represents a vector from the northeast. 2 represents a vector from the east, and so on to 256, which represents a vector from the southwest. 16 represents a vector that starts in the tile and leaves in any direction. Inactive bits (value zero) are represented by small numbers, active bits (value one) are represented by large bold numbers. The location at which a vector enters a pixel does not matter in some embodiments. That is, the only thing that matters in determining what the bit values are for the connectivity mask is the direction of the previous rasterized pixel through which the vector passed, not the specific location that it entered the pixel being evaluated.

Figure 8:
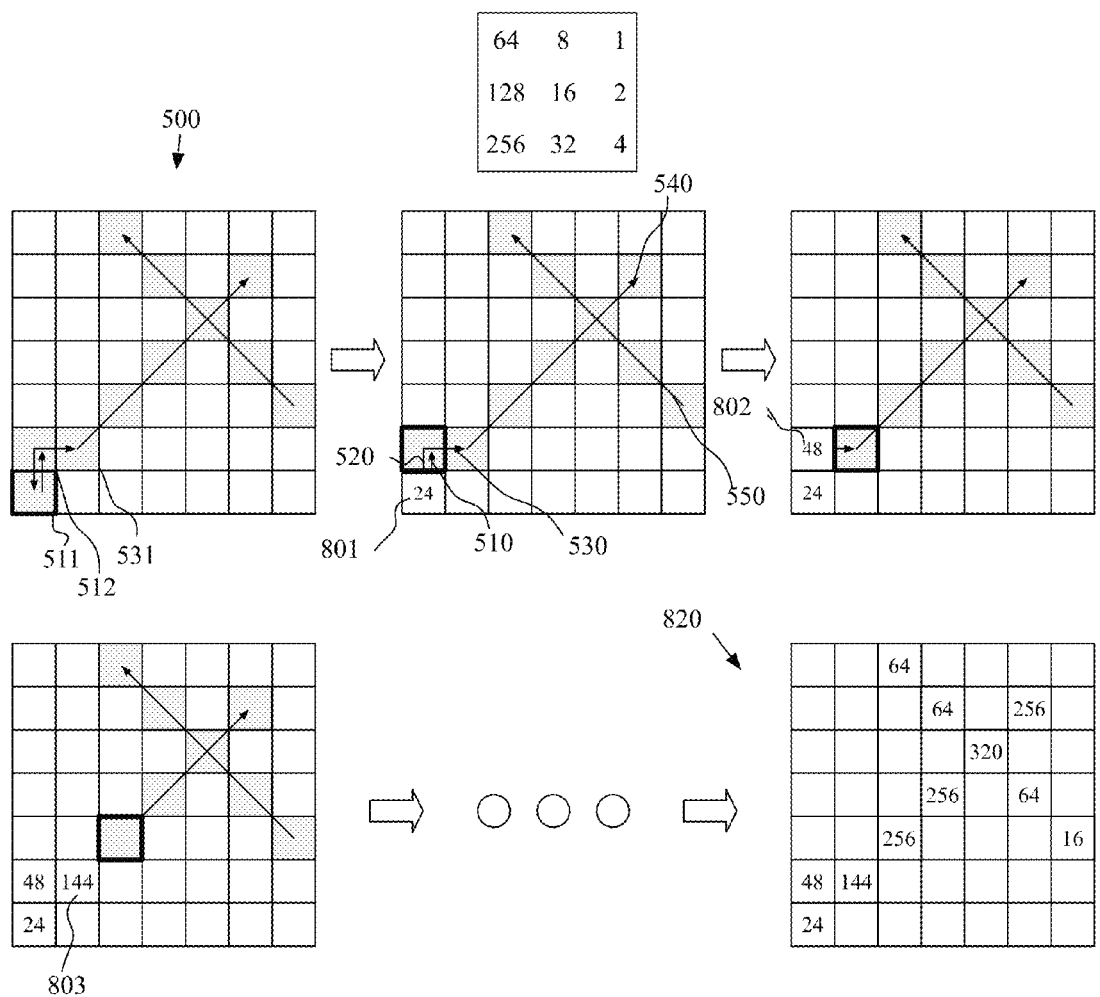
FIG. 8 conceptually illustrates the generation of connectivity byte mask values of all the rasterized pixels of an entire tile in some embodiments.

FIG. 8 conceptually illustrates the generation of connectivity byte mask values of all the rasterized pixels of an entire tile in some embodiments. The figure includes tile 500 from FIG. 5, with vectors 510, 520, 530, 540, and 550 and pixels 511, 512, 531 (other pixels from FIG. 5 are present in FIG. 8 but not discussed individually and are not labeled in this figure). The figure also includes the connectivity mask entries 801-803 and connectivity byte map 820.

Returning to FIG. 6, the process 600 receives (at 610) a set of road vectors. The road vectors define roads that lie at least partly within a particular tile to be evaluated. For example, the process could choose tile 700 of FIG. 7. The tile 700 has three road vectors. The process 600 then rasterizes (at 620) the vectors into pixels in the tile (e.g., as shown in tile 700). The process then selects (at 630) a previously unselected rasterized pixel. The first time the process reaches this operation, all the rasterized pixels are unselected. However, this operation is later repeated for each pixel in the tile. In some embodiments, the process selects the pixels in some particular order (e.g., first the lowest pixel on the right, then the next pixel from the right, etc.). In other embodiments, the process selects the pixel in some other order, or at random. In FIG. 7 the first selected pixel is pixel 710.

The pixel representation 711 also shows 3 vectors representing the three directions from which vectors enter the tile. The small numbers represent inactive (i.e. value zero) bits in the two connectivity bytes for the pixel. In this conceptual illustration, as each vector is considered, it will be removed and the inactive bit corresponding to the vector will be replaced with an active (i.e. value one) bit represented by a larger number in bold.

Once a pixel has been selected, the process 600 identifies (at 640) the direction from which a previously unselected vector enters the tile. On the first time through this operation for a given pixel, there are no previously unselected vectors. However, this operation is repeated for each vector that passes through or out of the tile. In FIG. 7, the first selected vector (in stage 701) is vector 714. The vector is coming in from the pixel to the southwest. Accordingly, the process identifies southwest as the direction from which the vector enters. Before the vector is selected, none of the directional bits is active. The inactive bits include the southwest bit. This is shown by the small numbers (1, 2, 4, 8, 16, 32, 64, 128, and 256) in the pixel representation 711, Therefore, when the process 600 of FIG. 6 determines (at 650) whether there is an active directional bit for the southwest bit, the process determines that there is not. The bit would be active if another vector from that direction had previously been selected (e.g., if an overlapping road in the same direction had previously been evaluated). However, none of the vectors in this figure are in the same direction, so there are no overlapping roads in the same direction as each other.

As the southwest bit was previously inactive, the process 600 adds the southwest bit to the connectivity byte map (i.e., as the direction from which the selected vector enters the pixel). This is represented in FIG. 7 by the large number 256 in stage 702. The process then eliminates that vector from consideration for that particular pixel and determines (at 670) whether there are any other vectors through the pixel. If there are other vectors through the pixel then the process returns to operation 640 where it identifies (at 640) a direction from which another vector enters the pixel. In FIG. 7, this is vector 712 in stage 702. The vector 712 enters from the northeast so the process activates the bit represented by the number 1, which is shown as large in stage 704. Similarly, after vector 716 from the northwest is selected in stage 703, the process activates the bit corresponding to the number 64, which is shown as large in stage 704. The active bits can be represented by the binary number 00000001 01000001 or the equivalent decimal number 321, as shown in stage 705.

Thus, the process generates connectivity byte mask bits for pixel 710 by evaluated the vectors passing through pixel 710. Once the process 600 determines (at 670) that the process has evaluated all the vectors passing through the selected pixel, then the process moves to operation 680. The process determines (at 680) whether the selected pixel was the last unselected pixel in the tile. If not, then the process returns to operation 630 and selects a new pixel (e.g., pixel 760 in FIG. 7). The process then repeats operations 640-670 until there are no remaining vectors to evaluate for the selected pixel. In FIG. 7 the pixel representation 761 has only one vector coming out of it in stage 771, which originates in the pixel. For a vector like vector 762 that originates in a pixel, the process 600 activates (at 660) the bit represented by the number 16 in stage 772. Since that is the only vector connected to pixel representation 761, the process 600 does not loop back (at 670) and the connectivity byte map value corresponding to that pixel is determined to be 16 as shown in stage 773.

FIG. 8 conceptually illustrates the results of process 600 applied to an entire tile. This figure uses the same tile 500 and vectors 510-550 as FIG. 5. Pixel 511 (lower right corner) has a vector 510 originating in the pixel (bit value 16) and a vector 520 entering from the north (bit value 8), and is therefore represented as an entry 801 in the connectivity byte mask as number 24. Pixel 512 has a vector 520 entering from the south (bit value 32) and is the origin of two vectors 520 and 530 (bit value 16 each). The bit value for each vector originating in the pixel 512 is 16. However, redundant connectivity bits are not counted twice (i.e. due to operation 650 in FIG. 6 causing operation 660 to be skipped). Therefore, the entry 802 is represented by the sum of 32 and 16, or 48 (as shown in entry 802). Similarly, entry 803 (144) for pixel 531 represents the sum of the bit values from vectors from the west (vector 530, bit value 128) and an originating vector 540 (bit value 16). After entry 803 is made, the rest of the values are filled in one by one (not shown individually), resulting in connectivity byte map 820. Once the process 600 determines (at 680) that it has generated connectivity bytes for the last rasterized pixel, the process 600 ends.

The connectivity byte masks described above represent each of the eight possible directions of the adjacent active pixel from which a vector can enter an active pixel with a bit and represent vectors that begin in an active pixel with a ninth bit. However, in other embodiments the connectivity byte masks represent each of the eight possible directions of the adjacent active pixel from which a vector can leave (rather than enter) an active pixel with a bit and represent vectors that end (rather than begin) in an active pixel with a ninth bit. That is, some embodiments use connectivity bitmaps that store the approximate directions in which a vector enters the active pixel and whether a vector originates in the active pixel. However, other embodiments use connectivity bitmaps that store the approximate directions in which a vector leaves the active pixel and whether the vector ends in the active pixel.

C. Constructing Undirected Graph

Figure 9:
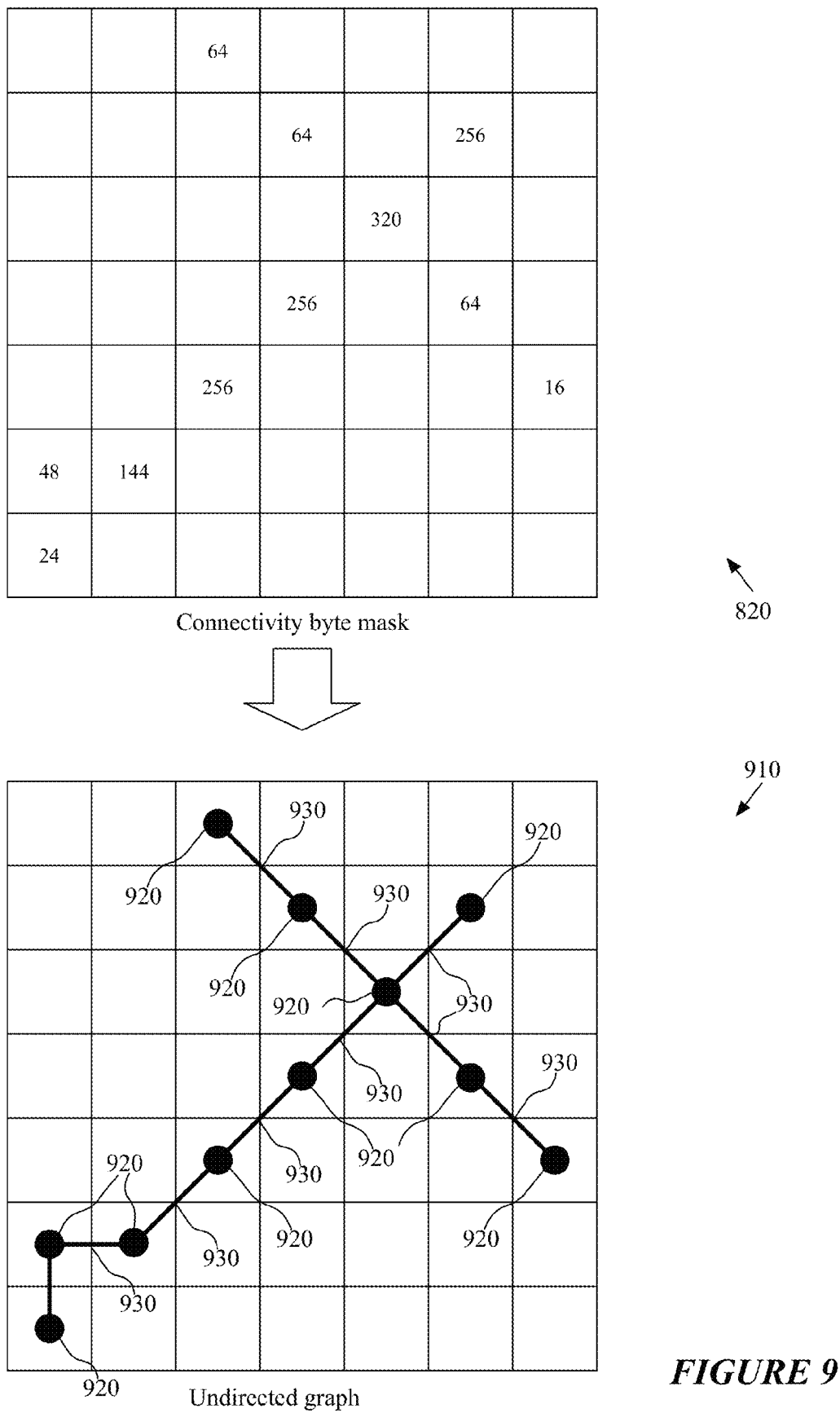
FIG. 9 conceptually illustrates the conversion of a connectivity byte mask to an undirected graph in some embodiments.

As described by reference to FIG. 3, the process 300 constructs (at 340) an undirected graph from the connectivity map. In the undirected graph, each rasterized pixel is a vertex connected to one or more other vertices by an edge. FIG. 9 conceptually illustrates the conversion of a connectivity byte mask 820 to an undirected graph 910 in some embodiments. FIG. 9 includes connectivity byte mask 820, and undirected graph 910. The undirected graph 910 has vertices 920 and edges 930. To preserve the topology of the original vectors, the connections are constrained so as to not directly connect two vertices unless the original vectors would have connected the pixels the vertices represent. One feature of an undirected graph that separates it from the connectivity byte mask is that the undirected graph does not include information about the direction of the connections between the vertices. Accordingly, unlike the original vectors, and connectivity byte mask 820, the undirected graph 910 does not include data for the two separate vectors 510 and 520. Not having to keep track of overlapping road segments in opposite directions represents a savings in data storage amounts.

Although many of the directions of vectors described herein have been characterized as compass directions with "north" being a vector toward the top of the map, this was for convenience of description. In some embodiments, maps can be generated using other compass directions as the direction toward the top of the map. Although each of the illustrated vectors in the tiles represents a road passing through at least two pixels, in some embodiments and at some scales, there may be vectors (e.g., representing short roads or road segments) that start and end in the same pixel. In some embodiments, vectors that start and end within the same pixel are not represented in the undirected graph. In some embodiments, road segments that start and end in a single pixel, but collectively reach from one side of the pixel to other (mathematically, not visually) are treated collectively.

D. Traced Graph

The process 300 generates the undirected graph with multiple vertices, one per pixel. Some of the vertices lie in straight lines that could be represented by fewer vertices (e.g., described as a line connecting two vertices rather than a series of more than two vertices). To reduce the number of vertices, and thus the amount of data to be stored and transmitted, some embodiments simplify the undirected graphs. As a first step in simplifying the undirected graphs, some embodiments generate chains of connected vertices in a traced graph. After the traced graph is generated, the chains are simplified to produce lines of pixels that contain less data than the original vectors, but can be used to generate the same visual image of roads as the original vectors could.

Figure 10:
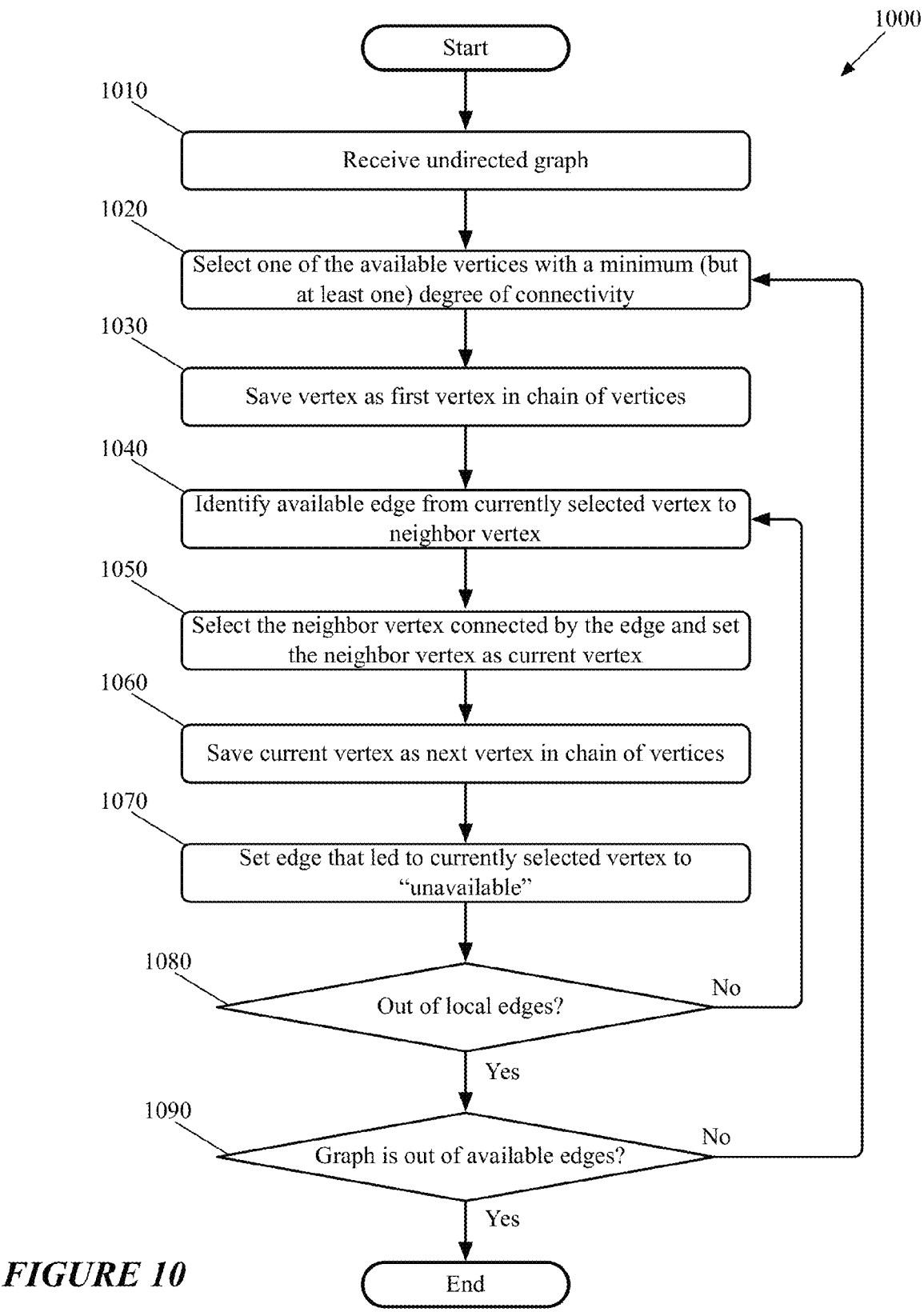
FIG. 10 conceptually illustrates a process of some embodiments for generating a traced graph.
Figure 11:
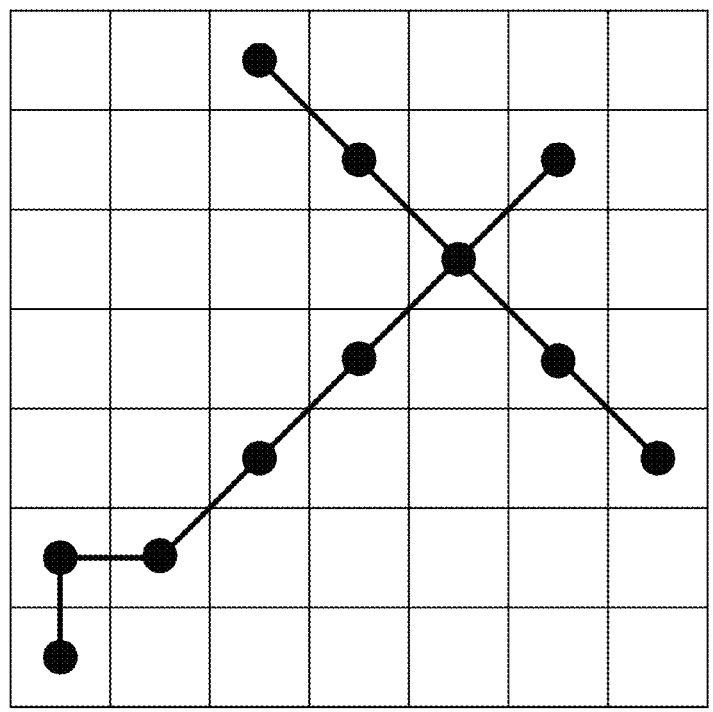
FIG. 11 conceptually illustrates the conversion of an undirected graph into a traced graph.
Figure 11:
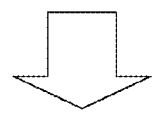
Figure 11:
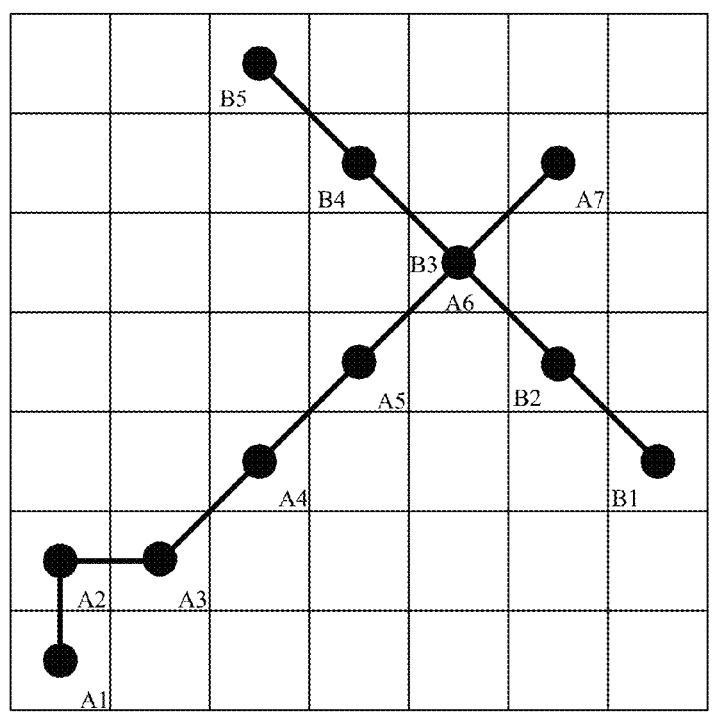

FIG. 10 conceptually illustrates a process 1000 of some embodiments for generating a traced graph. The figure will be described by reference to FIG. 11, which is described briefly first. FIG. 11 conceptually illustrates the conversion of an undirected graph into a traced graph. The figure includes undirected graph 910 and traced graph 1110. The traced graph 1110 has two chains of vertices, described by the characters A and B followed by a number to indicate their place in the chain. Vertex A6 and vertex B3 occupy the same pixel but are counted twice because roads from more than two directions meet at that point. Each of the intersecting roads is part of a separate chain through that vertex, therefore the vertex is accounted for as part of both chains.

Returning to FIG. 10, the process 1000 receives (at 1010) an undirected graph (e.g., the undirected graph 910 in FIG. 11 as generated by operation 340 of process 300 in FIG. 3). The process then selects (at 1020) one of the available vertices of the graph with a minimum degree of connectivity. The degree of connectivity is a measure of the number of edges that connect to a vertex. Vertices at the end of a line have $1^{st}$ degree connectivity. Vertices in the middle of a line have at least $2^{nd}$ degree connectivity. Vertices at t-junctions have $3^{rd}$ degree connectivity and so on. In some embodiments, the process selects a vertex with $1^{st}$ degree connectivity if one is available and selects a vertex with $2^{nd}$ degree connectivity if no vertex of $1^{st}$ degree connectivity is available. A vertex is available if there is at least one previously unused edge connecting that vertex to another vertex. When the process 1000 begins, all vertexes in the tile are available. However, as the process proceeds, edges are used and some vertexes become unavailable for further tracing. In FIG. 11, the process 1000 has selected vertex A1 as the first vertex in a chain of vertices.

The process 1000 then saves (at 1030) the vertex (e.g., vertex A1) as the first vertex in a chain of vertices. The process then identifies (at 1040) an available edge from the currently selected vertex (e.g., A1) to a neighbor vertex (e.g., the edge from A1 to A2 in FIG. 11). The process then selects (at 1050) the neighbor vertex (e.g., A2) and sets the neighbor vertex as the current vertex. The process then saves (at 1060) the current vertex (e.g., A2) as the next vertex in the chain of vertices. The process then sets (at 1070) the edge that lead from the previous vertex to the current vertex to "used", or "unavailable". One of ordinary skill in the art will understand that this is not necessarily a literal labeling of "used", and that in various embodiments various variable are used to represent the unavailable status of the edge. In some embodiments, in order to calculate the chains, the vertices and edges are transferred to a temporary map and the edges are deleted from the map after they are used once.

The process then determines (at 1080) whether there are any local edges leaving the current vertex, not including any that have been labeled "used", etc. If there are local edges left available, then the process 1000 returns to operation 1040 and identifies an available edge from the currently selected vertex to a neighbor vertex. In FIG. 11 the only reachable neighbor vertex from vertex A2 is A3, since the edge between A1 and A2 has been set as "used". The process 1000 loops through operations 1040 to 1080 until there are no edges available to from the then current vertex. In FIG. 11, this occurs at vertex A7. After starting at vertex A1, the only time there is a choice of next vertex to go to is at A6/B3, where the process could choose any vertex out of A7, B4, and B2. However, some embodiments have a preference for continuing in a straight line unless there is no other option. Such embodiments choose, as the next vertex, a vertex that is further on in the same direction as the current vertex was from the previous vertex. Accordingly, the process 1000 chose vertex A7, where the chain ended. Other embodiments choose at random, or have other criterion for their choice of direction at a branching vertex, such as choosing the next neighbor with the highest (or lowest) degree of connectivity.

After the process determines (at 1080) that there are no available edges from the current vertex (e.g., no available edges from A7), the process determines whether the undirected graph as a whole is out of available edges. In the case of traced graph 1110 once the chain of A1-A7 is complete there are still the edges between the vertices that become the B1-B5 chain. Therefore, the process determines that the graph is not out of available edges and returns to operation 1020 to begin the next chain by selecting another vertex, preferably of 1$^{st}$ degree connectivity. Vertex B1 (with 1$^{st}$ degree connectivity) is chosen next in FIG. 11 and saved (at 1030) as the first vertex of a new chain. At this point, none of the vertices in the A1-A7 chain have any available edges to each other. However, because it was at a crossroads, the vertex A6/B3 still has available edges to B4 and B2. The process therefore loops through operations 1040-1080 to go from B1 to B2 to B3 to B4 to B5. At that point, the process determines (at 1090) that all available edges in the undirected graph have been used up and the process 1000 ends.

E. Simplification

Figure 12:
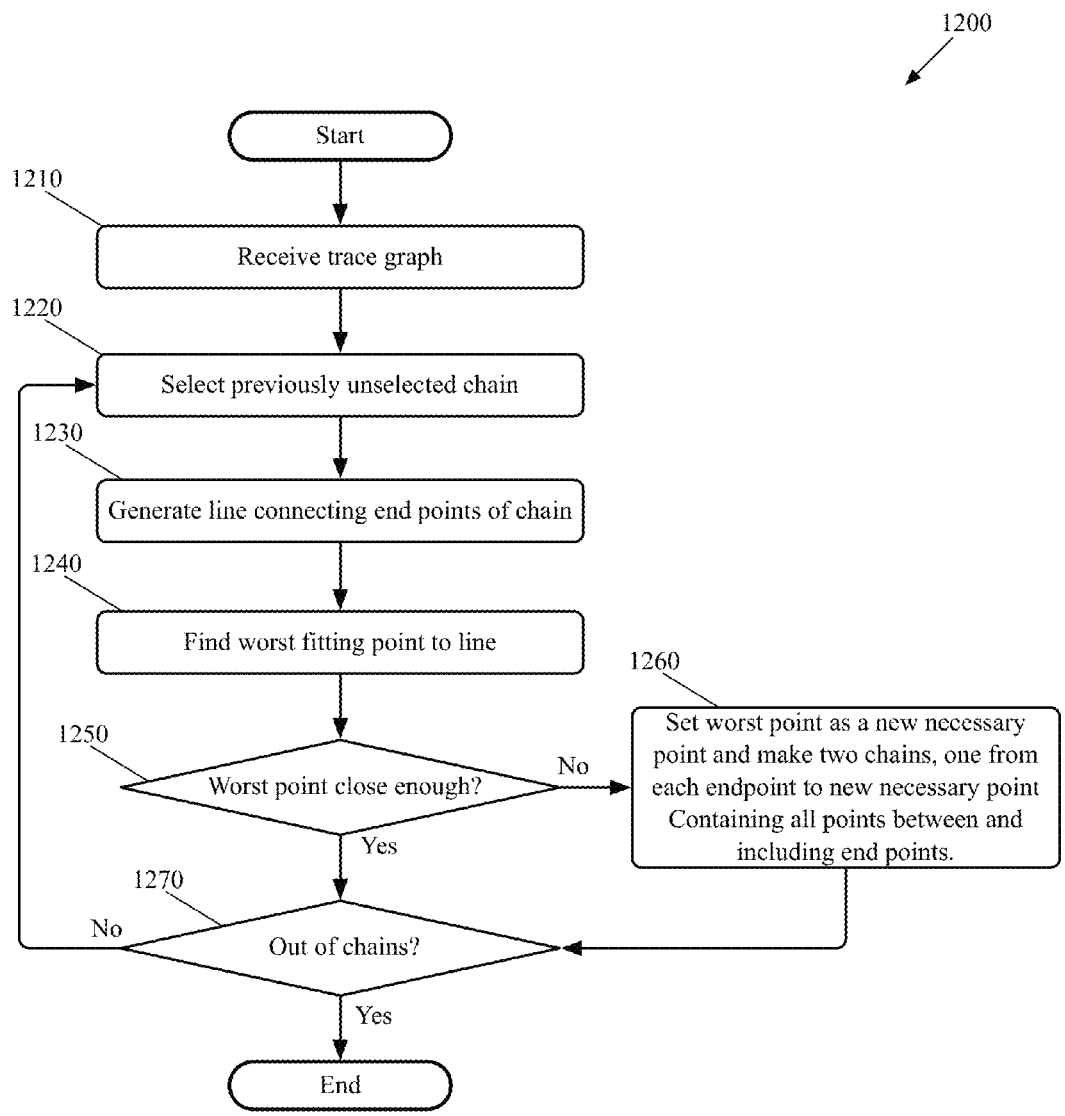
FIG. 12 conceptually illustrates the process of some embodiments that simplifies the traced graph.
Figure 13:
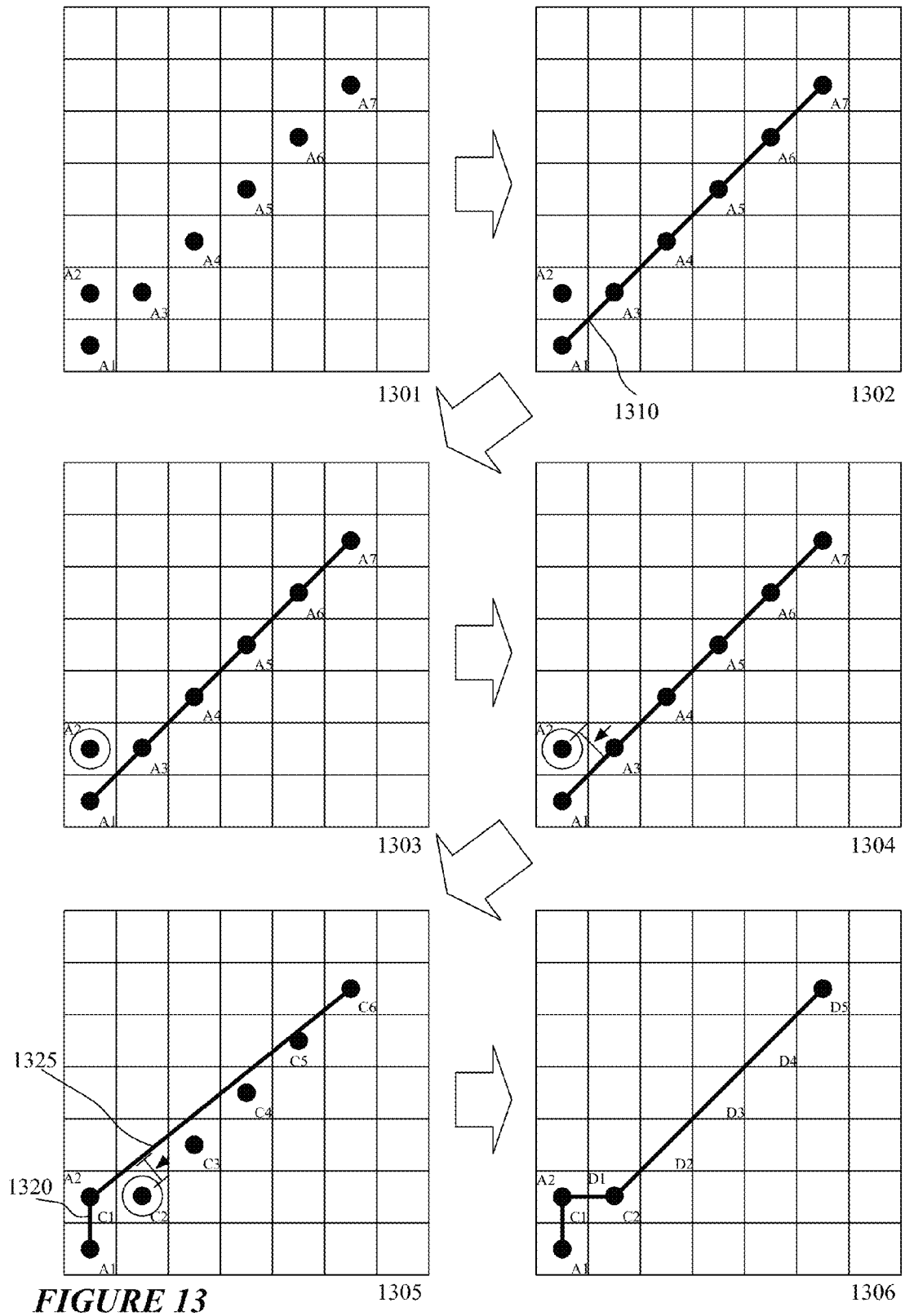
FIG. 13 conceptually illustrates the application of part of process to a chain of vertices from FIG. 11.

After the traced graph is generated the tile cutting program of some embodiments simplifies the traced chains. FIG. 12 conceptually illustrates the process 1200 of some embodiments that simplifies the traced graph. The process 1200 implements a Douglas-Peucker algorithm. FIG. 12 is described by reference to FIG. 13, which will be described briefly first. FIG. 13 conceptually illustrates the application of part of process 1200 to the chain A1-A7 of vertices from FIG. 11. The figure shows the simplification of chain A1-A7 in stages 1301-1306. The stages each include vertices A1-A7 and various lines that connect various vertices.

The process 1200 receives (at 1210) a traced graph (e.g., the traced graph 1110). The process then selects (at 1220) a previously unselected chain of vertices (e.g., chain A1-A7). In FIG. 13, this is shown in stage 1301 as vertices A1-A7. The process then generates (at 1230) a line 1310 connecting the end vertices of the chain A1 and A7 and marks the end vertices A1 and A7 as necessary vertices. This is shown in stage 1302.

The process 1200 then finds the vertex farthest from the line connecting the end vertices (the worst fitting vertex). In FIG. 13, vertex A2 is the worst fitting vertex, as shown in stage 1303. The process determines (at 1250) whether the worst point is more than a threshold distance from the line 1310. In some embodiments this is a small value, in other embodiments, the threshold is zero. The measurement of the distance from the line to the worst fitting vertex point is shown in FIG. 13 stage 1304. If the worst fitting vertex point is farther away than the threshold value, then the process 1200 sets (at 1260) the worst fitting vertex as a necessary vertex for the map and generates two new chains by splitting the current chain in two.

The first new chain goes from one of the end points of the previous chain to the worst fitting vertex point. The second new chain goes from the other end of the previous chain to the worst fitting vertex point. Each new chain incorporates all the intermediate points of the original chain and each new chain includes the just identified necessary vertex (which was the worst fitting vertex). In FIG. 13, stage 1305 shows the two new chains, chain A1 to A2 and chain C1 (the old vertex A2) to C6. The vertices of new chain C1-C6 have been renamed to distinguish them as part of a new chain of vertices, they have been renamed as chain "C" to distinguish them from chains "A" and "B" (of FIG. 11). The designation of which chain new stays "A" and which becomes "C" is arbitrary and is made for conceptual clarity only as some embodiments have other naming conventions for their chains of vertices. The vertices C2-C6 are no longer part of the chain "A" (now comprised of vertices A1 and A2) at this stage.

The process 1200 is iterative. The process determines (at 1270) that the process has not run out of chains to evaluate (in fact it has one extra chain). Therefore, the process 1200 loops back to perform operations 1220-1250 again.

Stage 1305 also shows line 1320 that connects vertex A1 directly to vertex A2, and line 1325 that connects vertex C1 to vertex C6 (vertex C1 is the same vertex as vertex A2). The stage 1305 also shows the worst fitting vertex (C2) of chain C1-C6 and the measurement of the distance of that vertex from the line 1325. The process 1200 finds no worst vertex for the chain A1-A2, so it goes on to evaluate chain C1-C6. In that chain, the worst fitting vertex (C2) is found (at 1250) to be too far from the line, so it is designated a necessary vertex and the line is split up (in stage 1306) to form chains C1-C2 and D1-D5 (vertex C2 is also vertex D1). The "C" vertices C2-C6 have been renamed as "D" vertices to distinguish the new "D" chain from the former "C" chain. The decision of which chain became "D" and which remained "C" was arbitrary. When the process 1200 loops around again, the process finds no points beyond the threshold distance and therefore skips operation 1260 for chains C1-C2 and D1-D5.

At that point all chains stemming from original chain A1-A7 have been evaluated and the necessary vertices found by process 1200 so far are vertices A1, C1, D1, and D5. At this point a chain of four vectors (vectors 510, 520, 530, 540 of FIG. 5) that would have taken a total of 8 vertices to describe (one vertex for each start and endpoint of each vector) now take only 4 vertices to describe a chain of roads from A1 to C2 to D1 to D5 which can also be described as a chain of vertices (0,0) (0,1) (1,1) (5,5)

Figure 14:
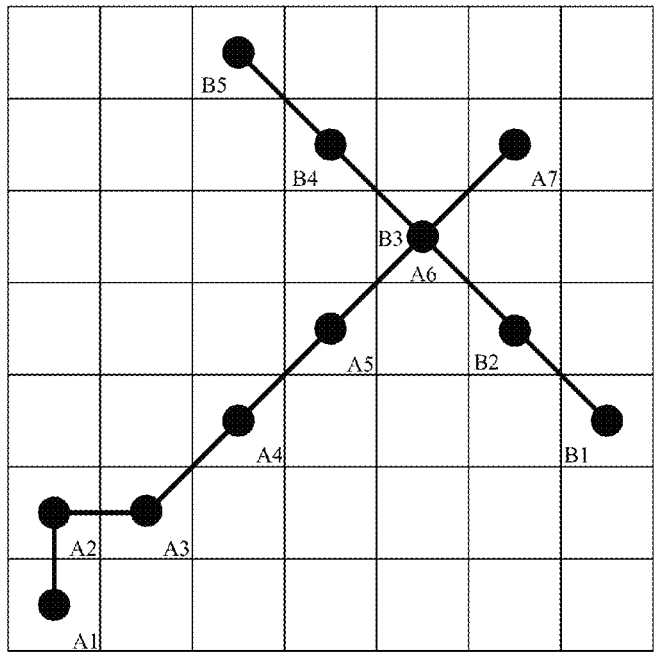
FIG. 14 conceptually illustrates the complete simplification of a traced graph to a simplified graph.
Figure 14:
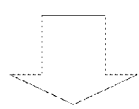
Figure 14:
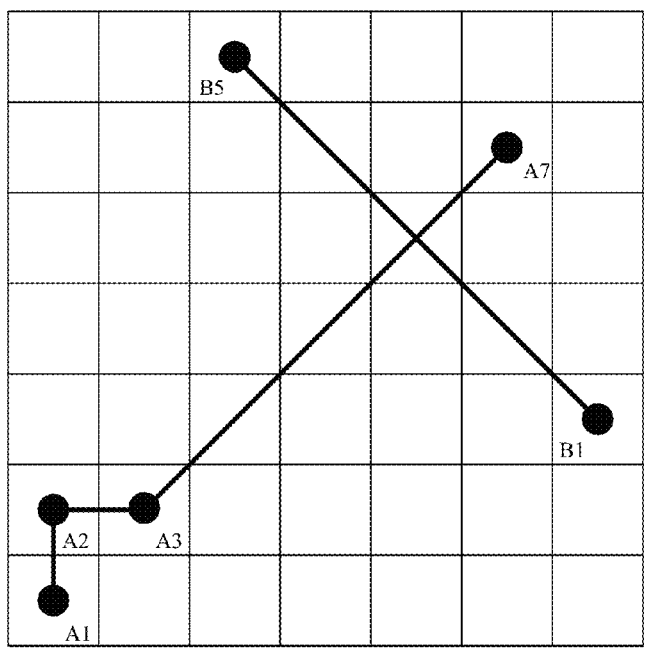

The process 1200 loops back one more time to evaluate chain B1-B5, which is a straight line, so there is no worst fitting vertex and the only necessary vertices are B1 and B5. FIG. 14 conceptually illustrates the complete simplification of traced graph 1110 to simplified graph 1410. In simplified graph 1410, there are a total of 6 vertices, representing a 40% savings of data from the original 5 vectors (defined by 10 vertices).

Figure 15:
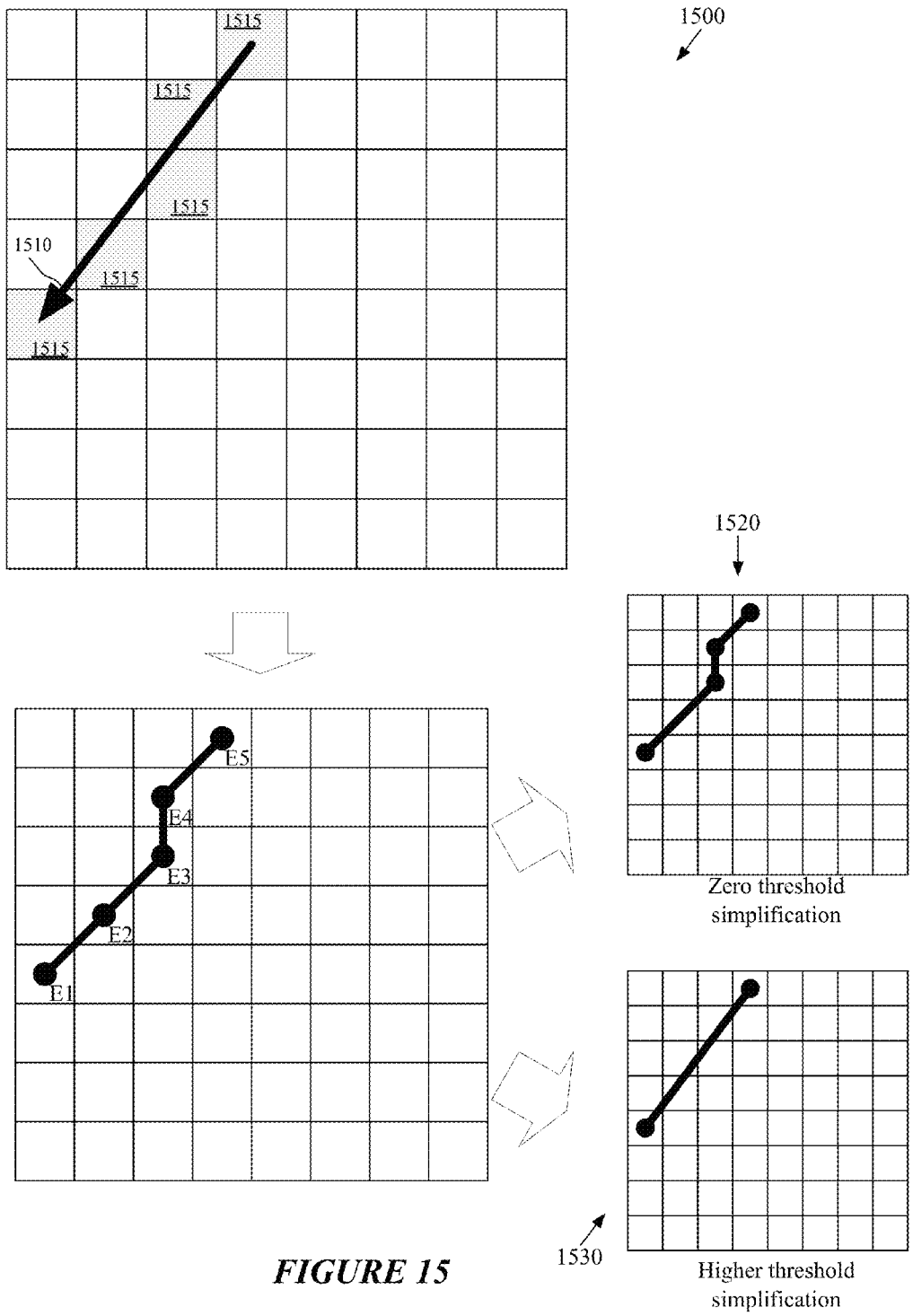
FIG. 15 illustrates the effects of different distance thresholds for adding necessary vertices in different embodiments.

FIG. 15 illustrates the effects of different distance thresholds for adding necessary vertices in different embodiments. The figure includes tile 1500, with rasterized vector 1510, and rasterized pixels 1515, traced graph E1-E5 and simplified graphs 1520 and 1530. The rasterized pixels in this example do not line up exactly with the vector. As a result, the traced graph does not perfectly reproduce the original vector. The process 1200 (of FIG. 12) generates simplified graph 1520 in some embodiments using a zero (or very low) threshold for the Douglas-Peucker algorithm. Except for E2, all the vertices of the chain E1-E5 are necessary to accurately represent the rasterized pixels 1515.

Alternatively, in some embodiments, a higher threshold for the Douglas-Peucker algorithm is used which results in the process 1200 identifying fewer vertices as necessary vertices. This produces a simplified graph with fewer vertices, such as simplified graph 1530, with two vertices. In this example, the simplified graph 1530 accurately reproduces the original vector because detail that was lost in rasterization is coincidentally recovered in generating the simplified vector. Similarly, in other examples where the actual road happens to lie along a straight line from start vertex to end vertex the higher threshold might also happen to result in a more representation. However in other examples the graph might less accurately represent the original roads, as in the case of roads that are represented by a series of 90 degree and 45 degree lines on the tile. Accordingly, in some examples, using a lower threshold would generate a set of vertices that more accurately represent the actual roads. One example of this would be a road that actually follows the path of chain E1-E5. In that case, the higher threshold would also result in simplified graph 1530, which would be a less accurate representation of the actual roads in that example than simplified graph 1520.

One of ordinary skill in the art will understand that different embodiments use different thresholds. Furthermore, in some embodiments, different thresholds are used at different zoom levels of the same process. Higher threshold values allow for better compression ratios (reducing the same amount of initial data to less final data), but at least in some circumstances are less accurate in representing the roads. Accordingly, they may be used in circumstances where a high level of accuracy is not as important. For example, some embodiments use a higher threshold at lower zoom levels (i.e., larger map scales) and a lower threshold at higher zoom levels (i.e., smaller map scales). This has the advantages of allowing better compression ratios at higher levels at which high accuracy is not as important in some embodiments while still allowing better accuracy at the levels at which users are likely to notice inaccuracies (e.g., street levels). In some embodiments, a data guide is used to store settings to be used at different zoom levels, including the thresholds that determine how far the worst fit vertex can be from the connections of a simplified set of vertices.

F. Advantages of Scaling

Figure 16A:
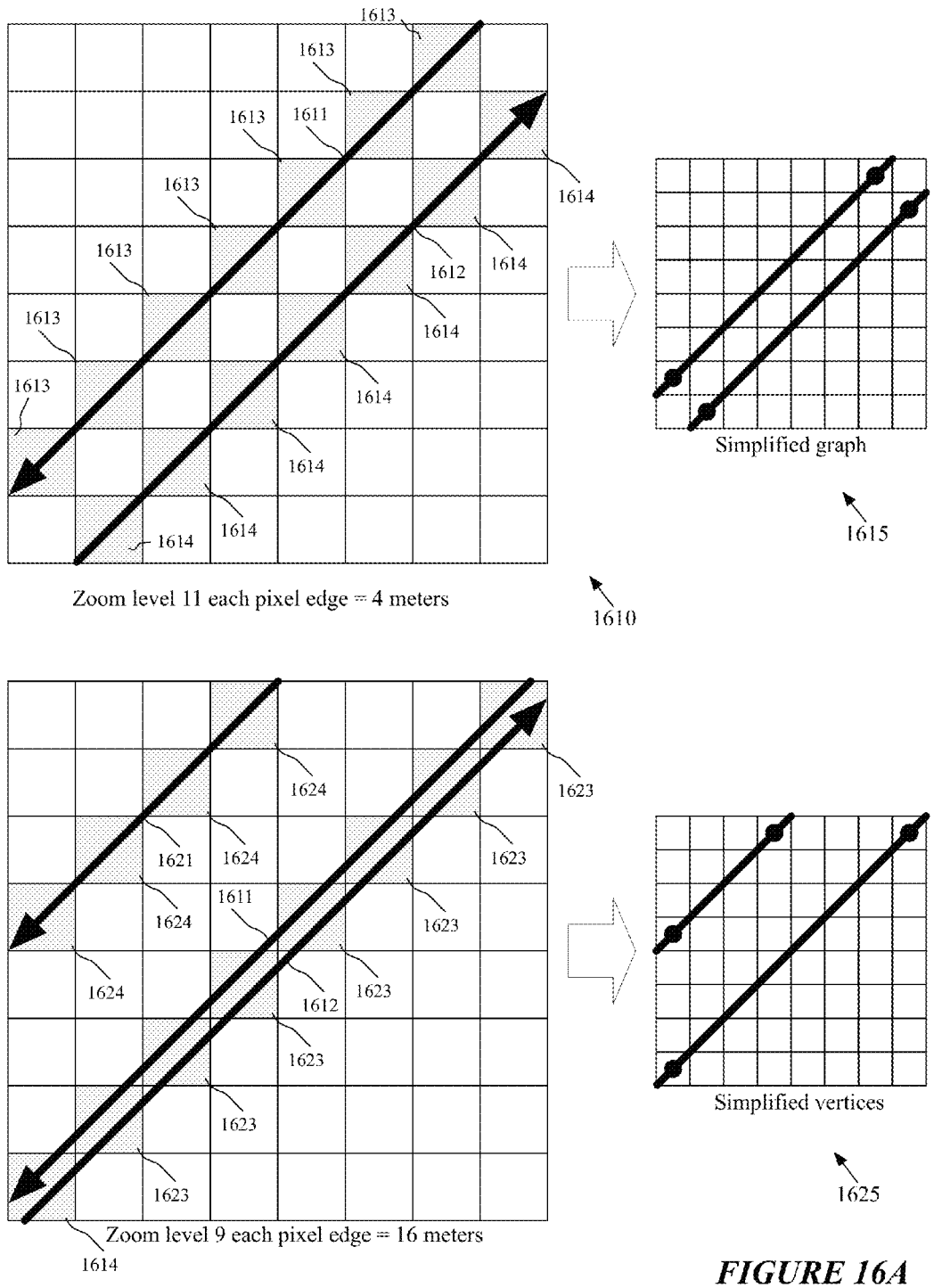
FIGS. 16A and 16B illustrate how maps at a larger scale can provide better ratios of compressed data to original data than a map at a smaller scale in some embodiments.
Figure 16B:
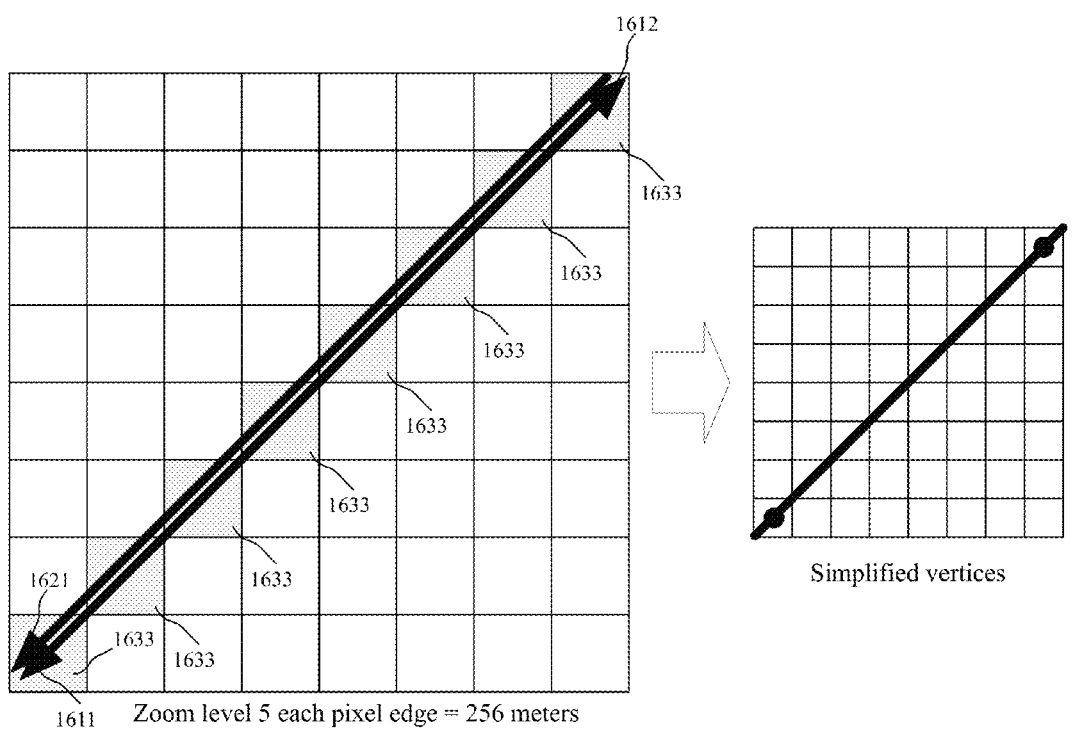

The processes for recoding and simplifying vectors that were previously illustrated were each illustrated as being performed on vectors at a single scale. However, some embodiments allow the same type of process to be performed at multiple scales. FIGS. 16A and 16B illustrate how maps at a larger scale can provide better ratios of compressed data to original data than a map at a smaller scale in some embodiments. The figures show segments of the same set of roads at different map scales. FIG. 16A includes map 1610 at zoom level 11 (e.g., 4 meters per pixel), and map 1620 at zoom level 9 (e.g., 16 meters per pixel) and the simplified graphs 1615 and 1625 respectively that result from performing process 300 (of FIG. 3) on the maps 1610 and 1620. Map 1610 includes vectors 1611 and 1612 and pixel sets 1613 and 1614. Map 1620 includes vectors 1611, 1612, and vector 1621 and pixel sets 1623 and 1624.

Each vector 1611 and 1612 of map 1610 requires data for its start and end point, a total of two vertices worth of data per vector (4 vertices in all). After the process 300 is performed on the map 1310, the simplified graph has 4 vertices on it representing the same set of pixels 1612 and 1614, respectively as vectors 1611 and 1612. Accordingly, at zoom level 11, the process 300 provides no savings for two unconnected vectors on different sets of pixels 1613 and 1614.

At zoom level 9, the map 1620 has both vectors 1611 and 1612 on it, but at this scale, the two vectors are close enough to share a common set of pixels 1613 (in these example maps, the roads are long enough that a segment of the same road goes from one corner of the map to the opposite corner at all scales). At this scale, a road that was not visible on the previous scale of the map is represented by vector 1621. The three vectors 1611, 1612, and 1621 use 6 vertices worth of data. The simplified graph has only four vertices, because the sets of pixels 1623 containing both vectors 1611 and 1612 are represented by one pair of vertices in the simplified graph. The other pair of vertices in the simplified graph represents the tiles 1624 of vector 1621. Therefore at this higher scale, there is a 33% data savings (i.e., eliminating 2 vertices out of 6) by simplifying the tiles.

Finally in FIG. 16B, map 1630 at zoom level 5 (e.g., 256 meters per pixel), has all three vectors 1611, 1612, and 1621 sharing a common set of pixels 1633. The simplified graph 1635 includes only two vertices because at this scale all three roads share a common set of pixels 1633. At this scale, the savings is approximately 67% (i.e., eliminating 4 vertices out of 6).

The scales provided herein are arbitrary and one of ordinary skill in the art will understand that in other embodiments different scales are used. Furthermore the data savings in the examples are not indicative of the actual data savings that could be provided by the tile cutting programs of some embodiments. For example, a tile cutting program of some embodiments employing the processes described herein could save almost 99% (going from over 39,000 input vertices to under 500 output vertices) of the input data at some scales of maps of the California freeway system. In some such embodiments, the savings would be greater than would otherwise be the case as a result of multiple input vectors starting and ending within a single pixel. That is, the system of some embodiments provides more savings of data when there are more redundant road segments.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 17:
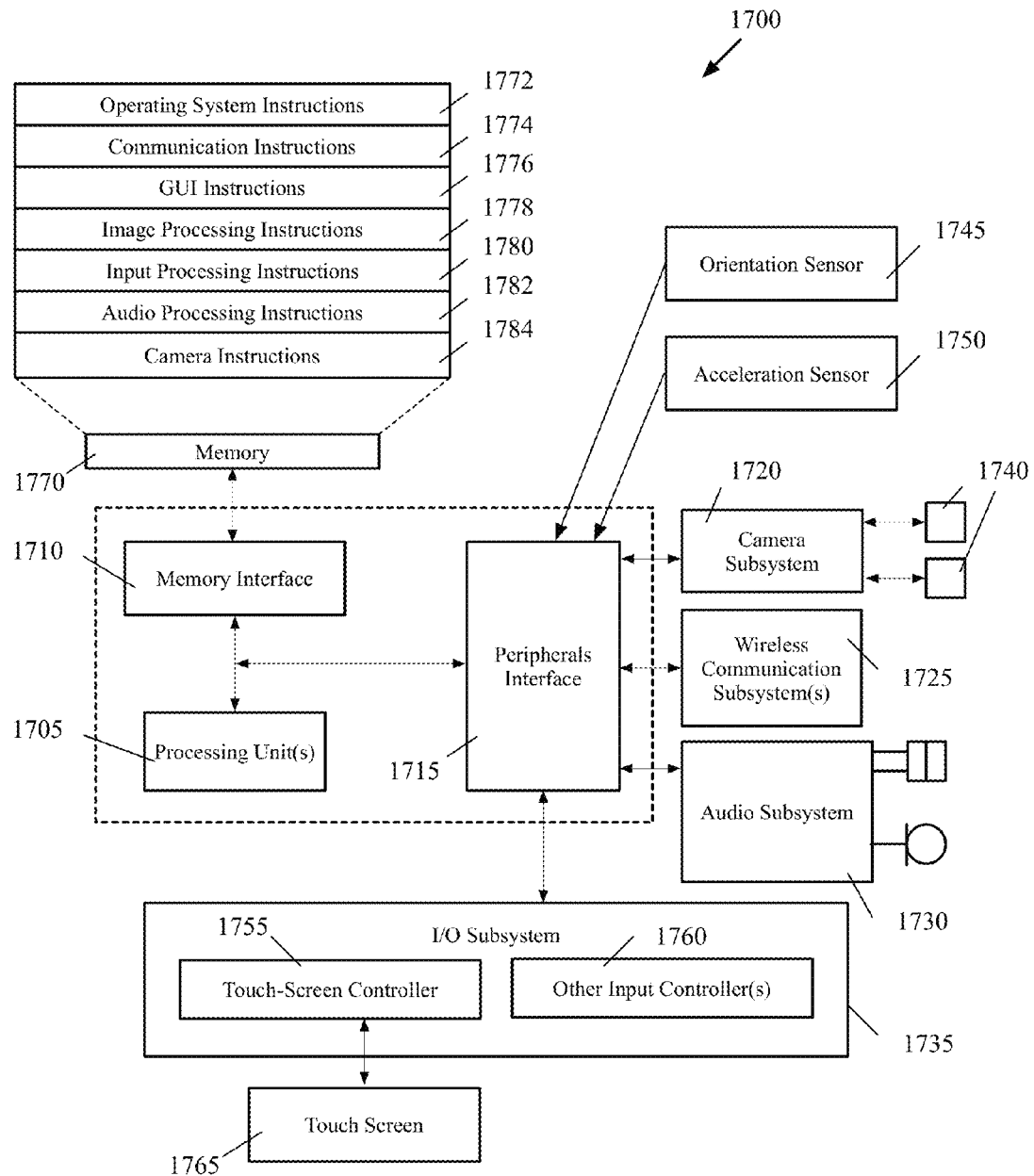
FIG. 17 is an example of an architecture of a mobile computing device in some embodiments.

The mapping and navigation applications of some embodiments operate on mobile devices, such as smart phones (e.g., iPhones®) and tablets (e.g., iPads®). FIG. 17 is an example of an architecture 1700 of such a mobile computing device. Examples of mobile computing devices include smartphones, tablets, laptops, etc. As shown, the mobile computing device 1700 includes one or more processing units 1705, a memory interface 1710 and a peripherals interface 1715.

The peripherals interface 1715 is coupled to various sensors and subsystems, including a camera subsystem 1720, a wireless communication subsystem(s) 1725, an audio subsystem 1730, an I/O subsystem 1735, etc. The peripherals interface 1715 enables communication between the processing units 1705 and various peripherals. For example, an orientation sensor 1745 (e.g., a gyroscope) and an acceleration sensor 1750 (e.g., an accelerometer) is coupled to the peripherals interface 1715 to facilitate orientation and acceleration functions.

The camera subsystem 1720 is coupled to one or more optical sensors 1740 (e.g., a charged coupled device (CCD) optical sensor, a complementary metal-oxide-semiconductor (CMOS) optical sensor, etc.). The camera subsystem 1720 coupled with the optical sensors 1740 facilitates camera functions, such as image and/or video data capturing. The wireless communication subsystem 1725 serves to facilitate communication functions. In some embodiments, the wireless communication subsystem 1725 includes radio frequency receivers and transmitters, and optical receivers and transmitters (not shown in FIG. 17). These receivers and transmitters of some embodiments are implemented to operate over one or more communication networks such as a GSM network, a Wi-Fi network, a Bluetooth network, etc. The audio subsystem 1730 is coupled to a speaker to output audio (e.g., to output voice navigation instructions). Additionally, the audio subsystem 1730 is coupled to a microphone to facilitate voice-enabled functions, such as voice recognition (e.g., for searching), digital recording, etc.

The I/O subsystem 1735 involves the transfer between input/output peripheral devices, such as a display, a touch screen, etc., and the data bus of the processing units 1705 through the peripherals interface 1715. The I/O subsystem 1735 includes a touch-screen controller 1755 and other input controllers 1760 to facilitate the transfer between input/output peripheral devices and the data bus of the processing units 1705. As shown, the touch-screen controller 1755 is coupled to a touch screen 1765. The touch-screen controller 1755 detects contact and movement on the touch screen 1765 using any of multiple touch sensitivity technologies. The other input controllers 1760 are coupled to other input/control devices, such as one or more buttons. Some embodiments include a near-touch sensitive screen and a corresponding controller that can detect near-touch interactions instead of or in addition to touch interactions.

The memory interface 1710 is coupled to memory 1770. In some embodiments, the memory 1770 includes volatile memory (e.g., high-speed random access memory), non-volatile memory (e.g., flash memory), a combination of volatile and non-volatile memory, and/or any other type of memory. As illustrated in FIG. 17, the memory 1770 stores an operating system (OS) 1772. The OS 1772 includes instructions for handling basic system services and for performing hardware dependent tasks.

The memory 1770 also includes communication instructions 1774 to facilitate communicating with one or more additional devices; graphical user interface instructions 1776 to facilitate graphic user interface processing; image processing instructions 1778 to facilitate image-related processing and functions; input processing instructions 1780 to facilitate input-related (e.g., touch input) processes and functions; audio processing instructions 1782 to facilitate audio-related processes and functions; and camera instructions 1784 to facilitate camera-related processes and functions. The instructions described above are merely exemplary and the memory 1770 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 17 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 17 may be split into two or more integrated circuits.

B. Computer System

Figure 18:
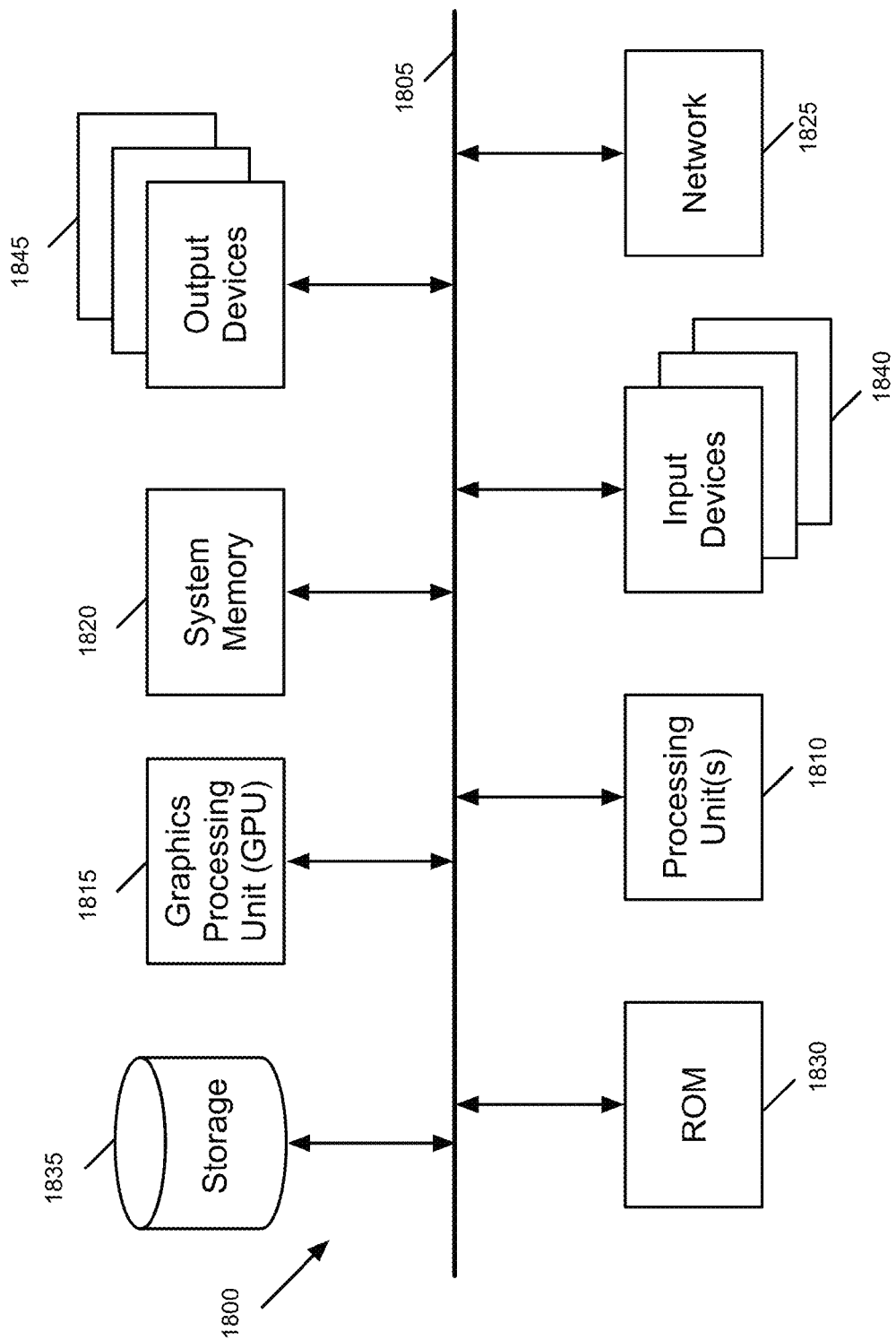
FIG. 18 conceptually illustrates another example of an electronic system with which some embodiments of the invention are implemented.

FIG. 18 conceptually illustrates another example of an electronic system 1800 with which some embodiments of the invention are implemented. The electronic system 1800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1800 includes a bus 1805, processing unit(s) 1810, a graphics processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the GPU 1815, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments. Some instructions are passed to and executed by the GPU 1815. The GPU 1815 can offload various computations or complement the image processing provided by the processing unit(s) 1810. In some embodiments, such functionality can be provided using CoreImage's kernel shading language.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive, integrated flash memory) as the permanent storage device 1835.

Other embodiments use a removable storage device (such as a floppy disk, flash memory device, etc., and its corresponding drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor needs at runtime. In some embodiments, the invention's processes are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 19:
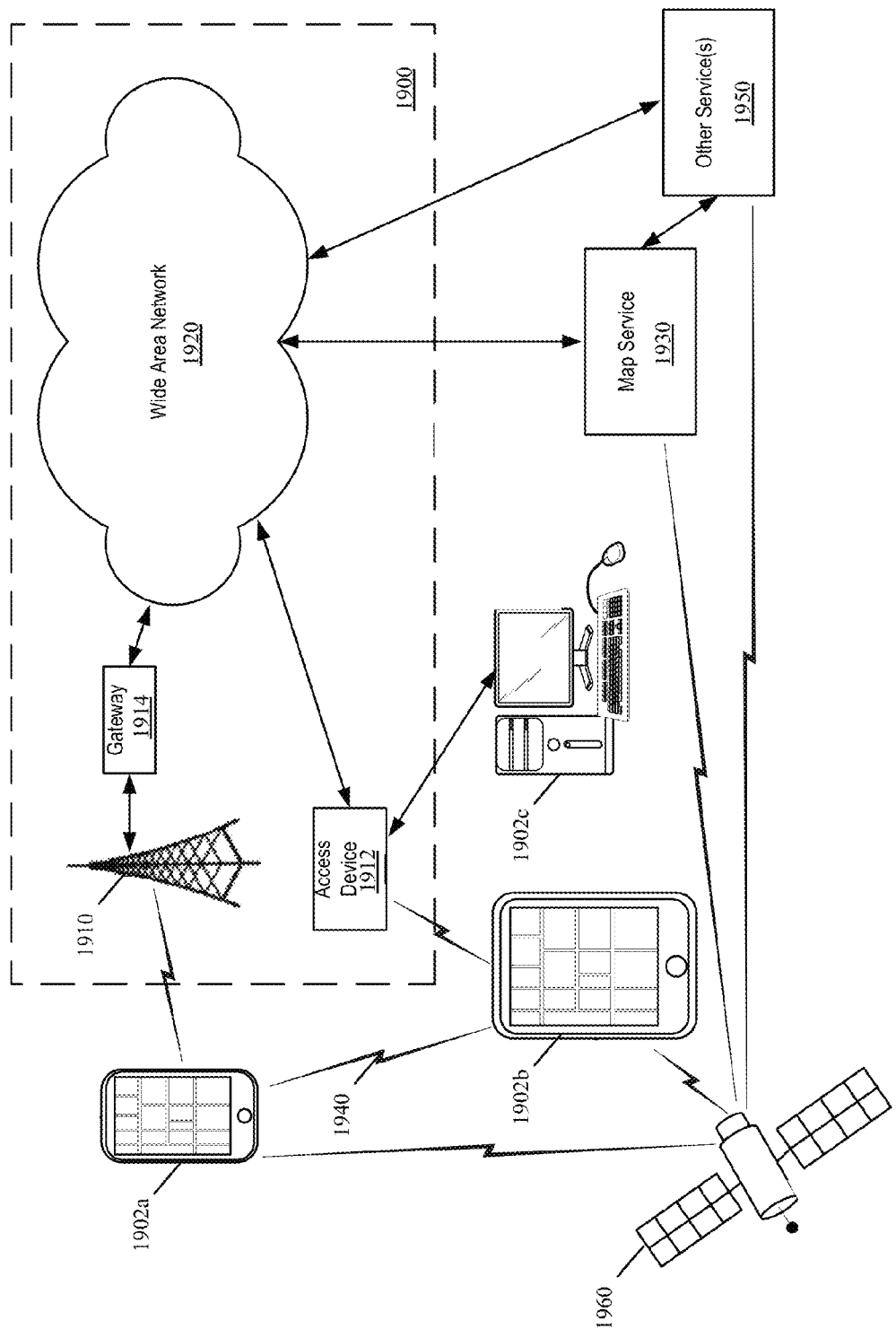
FIG. 19 illustrates a map service operating environment, according to some embodiments.

Various embodiments may operate within a map service operating environment. FIG. 19 illustrates a map service operating environment, according to some embodiments. A map service 1930 (also referred to as mapping service) may provide map services for one or more client devices 1902a-1902c in communication with the map service 1930 through various communication methods and protocols. A map service 1930 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1902a-1902c may utilize these map services by obtaining map service data. Client devices 1902a-1902c may implement various techniques to process map service data. Client devices 1902a-1902c may then provide map services to various entities, including, but not limited to, users, internal software or hardware modules, and/or other systems or devices external to the client devices 1902a-1902c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1902a-1902c) are implemented on different portable-multifunction device types. Client devices 1902a-1902c utilize map service 1930 through various communication methods and protocols. In some embodiments, client devices 1902a-1902c obtain map service data from map service 1930. Client devices 1902a-1902c request or receive map service data. Client devices 1902a-1902c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 19 illustrates one possible embodiment of an operating environment 1900 for a map service 1930 and client devices 1902a-1902c. In some embodiments, devices 1902a, 1902b, and 1902c communicate over one or more wire or wireless networks 1910. For example, wireless network 1910, such as a cellular network, can communicate with a wide area network (WAN) 1920, such as the Internet, by use of gateway 1914. A gateway 1914 in some embodiments provides a packet oriented mobile data service, such as General Packet Radio Service (GPRS), or other mobile data service allowing wireless networks to transmit data to other networks, such as wide area network 1920. Likewise, access device 1912 (e.g., IEEE 802.11g wireless access device) provides communication access to WAN 1920. Devices 1902a and 1902b can be any portable electronic or computing device capable of communicating with a map service. Device 1902c can be any non-portable electronic or computing device capable of communicating with a map service.

In some embodiments, both voice and data communications are established over wireless network 1910 and access device 1912. For instance, device 1902a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1910, gateway 1914, and WAN 1920 (e.g., using Transmission Control Protocol/Internet Protocol (TCP/IP) or User Datagram Protocol (UDP)). Likewise, in some implementations, devices 1902*b* and 1902*c* can place and receive phone calls, send and receive e-mail messages, and retrieve electronic documents over access device 1912 and WAN 1920. In various embodiments, any of the illustrated client device may communicate with map service 1930 and/or other service(s) 1950 using a persistent connection established in accordance with one or more security protocols, such as the Secure Sockets Layer (SSL) protocol or the Transport Layer Security (TLS) protocol.

Devices 1902*a* and 1902*b* can also establish communications by other means. For example, wireless device 1902*a* can communicate with other wireless devices (e.g., other devices 1902*b*, cell phones, etc.) over the wireless network 1910. Likewise devices 1902*a* and 1902*b* can establish peer-to-peer communications 1940 (e.g., a personal area network) by use of one or more communication subsystems, such as Bluetooth® communication from Bluetooth Special Interest Group, Inc. of Kirkland, Wash. Device 1902*c* can also establish peer to peer communications with devices 1902*a* or 1902*b* (not shown). Other communication protocols and topologies can also be implemented. Devices 1902*a* and 1902*b* may also receive Global Positioning Satellite (GPS) signals from GPS satellites 1960.

Devices 1902*a*, 1902*b*, and 1902*c* can communicate with map service 1930 over the one or more wire and/or wireless networks, 1910 or 1912. For instance, map service 1930 can provide a map service data to rendering devices 1902*a*, 1902*b*, and 1902*c*. Map service 1930 may also communicate with other services 1950 to obtain data to implement map services. Map service 1930 and other services 1950 may also receive GPS signals from GPS satellites 1960.

In various embodiments, map service 1930 and/or other service(s) 1950 are configured to process search requests from any of client devices. Search requests may include but are not limited to queries for business, address, residential locations, points of interest, or some combination thereof. Map service 1930 and/or other service(s) 1950 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1930 and/or other service(s) 1950 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1930 and/or other service(s) 1950, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1930 and/or other service(s) 1950 provide one or more feedback mechanisms to receive feedback from client devices 1902*a*-1902*c*. For instance, client devices may provide feedback on search results to map service 1930 and/or other service(s) 1950 (e.g., feedback specifying ratings, reviews, temporary or permanent business closures, errors etc.); this feedback may be used to update information about points of interest in order to provide more accurate or more up-to-date search results in the future. In some embodiments, map service 1930 and/or other service(s) 1950 may provide testing information to the client device (e.g., an A/B test) to determine which search results are best. For instance, at random intervals, the client device may receive and present two search results to a user and allow the user to indicate the best result. The client device may report the test results to map service 1930 and/or other service(s) 1950 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In addition, a number of the figures (including FIGS. 3, 6, 10, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of generating map tiles for a mapping application, the method comprising:
   receiving a request from a user device for a map tile at a particular zoom level;
   receiving a set of vectors, each vector representing a particular road segment in the map tile;

rasterizing the set of vectors to identify a set of active pixels through which the vectors pass based on the particular zoom level;
generating a connectivity byte mask that identifies a direction from which vectors enter a pixel for each active pixel in the connectivity byte mask;
generating an undirected graph of vertices and edges connecting the vertices from the connectivity byte mask;
reducing a number of the vertices within the undirected graph;
creating a simplified map tile with less data than the map tile based on the reduced number of vertices; and
transmitting the simplified map tile to the user device for rendering in the mapping application.

2. The method of claim 1, wherein the method further comprises generating a traced graph, that identifies connections between chains of vertices identifying ends of road segments, from the set of vectors, wherein reducing a number of the vertices comprises simplifying the traced graph to eliminate intermediate vertices.

3. The method of claim 2, wherein generating the traced graph comprises identifying the chains of vertices based on the undirected graph.

4. The method of claim 1, wherein the connectivity byte mask identifies a direction from which vectors enter a pixel in order to identify which active pixels are directly connected to adjacent active pixels.

5. The method of claim 1, wherein reducing a number of the vertices comprises removing intermediate vertices based on positions of the intermediate vertices with respect to end vertices.

6. The method of claim 1, wherein rasterizing the set of vectors further comprises eliminating redundant road segments in which vectors that represent the redundant road segments overlap a same set of active pixels.

7. A method of generating map tiles for a mapping application, the method comprising:
receiving a vector representing a road in an original map tile;
generating an undirected graph of vertices and edges connecting the vertices from the vector;
identifying a current vertex of the undirected graph in a chain of vertices connected by edges;
iteratively, for the chain of vertices:
identifying an available edge connecting the currently identified vertex to a candidate vertex;
making the candidate vertex the currently identified vertex;
adding the currently identified vertex to the chain;
setting the edge to be unavailable; and
repeating the iterated operations until the then currently identified vertex has no available edges for making connections; and
simplifying the vector by eliminating intermediate vertices in the chain of vertices in order to reduce a number of vertices in the chain of vertices.

8. The method of claim 7 further comprising creating a simplified map tile using the chain of vertices with the reduced number of vertices, wherein the simplified map tile comprises less data than the original map tile.

9. A method of eliminating data redundancy in a map tile, the method comprising:
receiving a plurality of vectors representing road segments in a geographical area represented by the map tile;
identifying a set of pixels through which the vectors pass by rasterizing the vectors to identify a set of active pixels through which the vectors pass;
generating a connectivity byte mask that identifies a direction from which vectors enter a pixel for each active pixel in the connectivity byte mask in order to identify which active pixels are directly connected to adjacent active pixels;
generating an undirected graph of vertices and edges from the connectivity byte mask;
generating a traced graph by identifying chains of vertices connected by edges in the undirected graph; and
simplifying the traced graph to generate a set of vertices that contain the relevant data from the vectors.

10. The method of claim 9, wherein generating the connectivity byte mask comprises removing roads going in a same direction on a same set of pixels in the map tile from road data about the map tile.

11. The method of claim 9, wherein generating the undirected graph comprises removing roads going in opposite directions on a same set of pixels in the map tile from road data about the map tile.

12. The method of claim 9, wherein the vectors are rasterized using a Bresenham line algorithm.

13. The method of claim 9, wherein the traced graph is simplified by a Douglas-Peucker algorithm.

14. The method of claim 9, wherein the rasterization operation removes redundant road segments that begin and end in a single pixel from the data.

15. The method of claim 9, wherein generating the traced graph comprises selecting a vertex in a same direction as a previous direction, when there is a choice of directions for selecting a next vertex.

16. A non-transitory machine readable medium storing a program that when executed by at least one processing unit generates map tiles for a mapping application, the program comprising sets of instructions for:
receiving a request from a user device for a map tile at a particular zoom level;
receiving a set of vectors, each vector representing a particular road segment in the map tile;
rasterizing the set of vectors to identify a set of active pixels through which the vectors pass based on the particular zoom level;
generating a connectivity byte mask that identifies a direction from which vectors enter a pixel for each active pixel in the connectivity byte mask;
generating an undirected graph of vertices and edges connecting the vertices from the connectivity byte mask;
reducing a number of the vertices within the undirected graph;
creating a simplified map tile with less data than the map tile based on the reduced number of vertices; and
transmitting the simplified map tile to the user device for rendering in the mapping application.

17. The non-transitory machine readable medium of claim 16, wherein the program further comprises a set of instructions for generating a traced graph, that identifies connections between chains of vertices identifying ends of road segments, from the set of vectors, wherein the set of instructions for reducing a number of vertices comprises a set of instructions for simplifying the traced graph to eliminate intermediate vertices.

18. The non-transitory machine readable medium of claim 17, wherein the set of instructions for generating the traced graph comprises a set of instructions for identifying the chains of vertices based on the undirected graph.

19. The non-transitory machine readable medium of claim 16, wherein the set of instructions for reducing a number of the vertices comprises a set of instructions for removing intermediate vertices based on positions of the intermediate vertices with respect to end vertices.

20. The non-transitory machine readable medium of claim 16, wherein the set of instructions for rasterizing the set of vectors further comprises a set of instructions for eliminating redundant road segments in which vectors that represent the redundant road segments overlap a same set of active pixels.

21. A non-transitory machine readable medium storing a program that when executed by at least one processing unit generates map tiles for a mapping application, the program comprising sets of instructions for:
- receiving a vector representing a road in an original map tile;
- generating an undirected graph of vertices and edges connecting the vertices from the vector;
- identifying a current vertex of the undirected graph in a chain of vertices connected by edges;
- iteratively, for the chain of vertices:
  - identifying an available edge connecting the currently identified vertex to a candidate vertex;
  - making the candidate vertex the currently identified vertex;
  - adding the currently identified vertex to the chain;
  - setting the edge to be unavailable; and
  - repeating the iterated operations until the then currently identified vertex has no available edges for making connections; and
- simplifying the vector by eliminating intermediate vertices in the chain of vertices in order to reduce a number of vertices in the chain of vertices.

22. The non-transitory machine readable medium of claim 21, wherein the program further comprises a set of instructions for creating a simplified map tile using the chain of vertices with the reduced number of vertices, wherein the simplified map tile comprises less data than the original map tile.

23. A non-transitory machine readable medium storing a program that when executed by at least one processing unit eliminates data redundancy in a map tile, the program comprising sets of instructions for:
- receiving a plurality of vectors representing road segments in a geographical area represented by the map tile;
- identifying a set of pixels through which the vectors pass by rasterizing the vectors to identify a set of active pixels through which the vectors pass;
- generating a connectivity byte mask that identifies a direction from which vectors enter a pixel for each active pixel in the connectivity byte mask in order to identify which active pixels are directly connected to adjacent active pixels;
- generating an undirected graph of vertices and edges from the connectivity byte mask;
- generating a traced graph by identifying chains of vertices connected by edges in the undirected graph; and
- simplifying the traced graph to generate a set of vertices that contain the relevant data from the vectors.

24. The non-transitory machine readable medium of claim 23, wherein the set of instructions for generating the connectivity byte mask comprises a set of instructions for removing roads going in a same direction on a same set of pixels in the map tile from road data about the map tile.

25. The non-transitory machine readable medium of claim 23, wherein the set of instructions for generating the undirected graph comprises a set of instructions for removing roads going in opposite directions on a same set of pixels in the map tile from road data about the map tile.

26. The non-transitory machine readable medium of claim 23, wherein the program further comprises a set of instructions for eliminating redundant road segments that begin and end in a single pixel from the tile data.

\* \* \* \* \*